US010693537B2

United States Patent
Li et al.

(10) Patent No.: US 10,693,537 B2
(45) Date of Patent: Jun. 23, 2020

(54) CODEBOOK SUBSET RESTRICTION METHOD

(71) Applicant: HUAWEI TECHNOLOGIES CO., LTD., Shenzhen, Guangdong (CN)

(72) Inventors: Xueru Li, Beijing (CN); Ruiqi Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/560,768

(22) Filed: Sep. 4, 2019

(65) Prior Publication Data

US 2019/0393938 A1 Dec. 26, 2019

Related U.S. Application Data

(63) Continuation of application No. PCT/CN2018/104805, filed on Sep. 10, 2018.

(30) Foreign Application Priority Data

Sep. 10, 2017 (CN) .......................... 2017 1 0809290

(51) Int. Cl.
*H04B 7/0456* (2017.01)
*H04B 7/0417* (2017.01)

(52) U.S. Cl.
CPC ......... *H04B 7/0456* (2013.01); *H04B 7/0417* (2013.01)

(58) Field of Classification Search
CPC combination set(s) only.
See application file for complete search history.

(56) References Cited

U.S. PATENT DOCUMENTS

| 2013/0163687 A1 | 6/2013 | Jing et al. |
| 2014/0016549 A1 | 1/2014 | Novlan et al. |

(Continued)

FOREIGN PATENT DOCUMENTS

| CN | 102082637 A | 6/2011 |
| CN | 103222201 A | 7/2013 |

(Continued)

OTHER PUBLICATIONS

3GPP TS 38.212 V1.0.0 (Sep. 2017), "3rd Generation Partnership Project; Technical Specification Group Radio Access Network; NR; Multiplexing and channel coding (Release 15)," Sep. 2017, 28 pages.

(Continued)

*Primary Examiner* — Linda Wong
(74) *Attorney, Agent, or Firm* — Fish & Richardson P.C.

(57) ABSTRACT

A bit field indication manner is provided. A first field is determined, where the first field includes $T_1$ bits, at least one of the $T_1$ bits indicates at least two elements $\{b_{i0}, b_{i1}, \ldots, b_{ik}\}$ in a set B, the at least one bit further indicates at least one element $\{\theta_{j0}, \theta_{j1}, \ldots, \theta_{jh}\}$ in a set $\Phi$, and at least one element in $\{b_{i0}, b_{i1}, \ldots, b_{ik}\}$ and at least one element in $\{\theta_{j0}, \theta_{j1}, \ldots, \theta_{jh}\}$ are used to form a precoding matrix, where the set $B=\{b_0, b_1, \ldots, b_{T_2-1}\}$, an element in the set B is a vector with a length of N/4, the set $\Phi=\{\theta_0, \theta_1, \ldots, \theta_{S-1}\}$, an element in $\Phi$ is a complex number of a unit amplitude.

8 Claims, 4 Drawing Sheets

(56) References Cited

U.S. PATENT DOCUMENTS

| | | | | |
|---|---|---|---|---|
| 2014/0211874 | A1* | 7/2014 | Xia | H04B 7/0626 375/267 |
| 2015/0280809 | A1 | 10/2015 | Seo et al. | |
| 2015/0358066 | A1* | 12/2015 | Liu | H04B 7/0417 375/267 |
| 2016/0006494 | A1* | 1/2016 | Yang | H04L 25/0391 370/329 |
| 2016/0013853 | A1 | 1/2016 | Han et al. | |
| 2016/0056870 | A1 | 2/2016 | Gao et al. | |
| 2016/0056873 | A1* | 2/2016 | Wang | H04B 7/0478 370/329 |
| 2016/0294454 | A1* | 10/2016 | Onggosanusi | H04B 7/0456 |
| 2016/0323022 | A1* | 11/2016 | Rahman | H04B 7/0469 |
| 2016/0323025 | A1 | 11/2016 | Liu et al. | |
| 2017/0041052 | A1* | 2/2017 | Blankenship | H04L 1/08 |
| 2017/0070334 | A1* | 3/2017 | Hammarwall | H04L 5/0057 |
| 2017/0099093 | A1* | 4/2017 | Zhang | H04B 7/0456 |
| 2017/0134082 | A1* | 5/2017 | Onggosanusi | H04B 7/0478 |
| 2017/0170883 | A1* | 6/2017 | Zhang | H04B 7/0417 |
| 2017/0250743 | A1* | 8/2017 | Jongren | H04B 7/0456 |
| 2017/0257154 | A1* | 9/2017 | Wernersson | H04B 7/0469 |
| 2017/0288751 | A1* | 10/2017 | Faxer | H04B 7/0456 |
| 2018/0013471 | A1 | 1/2018 | Gao | |
| 2018/0034519 | A1* | 2/2018 | Rahman | H04B 7/0456 |
| 2018/0076859 | A1* | 3/2018 | Faxer | H04B 7/0456 |
| 2018/0138954 | A1 | 5/2018 | Gao et al. | |
| 2018/0184441 | A1* | 6/2018 | Faxer | H04B 7/0456 |
| 2018/0191411 | A1* | 7/2018 | Faxer | H04B 7/0695 |
| 2018/0198499 | A1* | 7/2018 | Park | H04B 7/04 |
| 2018/0205438 | A1* | 7/2018 | Davydov | H04B 7/0469 |
| 2018/0316398 | A1* | 11/2018 | Wernersson | H04B 7/0469 |
| 2019/0068256 | A1* | 2/2019 | Muruganathan | H04B 7/0626 |
| 2019/0089441 | A1* | 3/2019 | Sivahumaran | H04B 7/0478 |
| 2019/0132031 | A1* | 5/2019 | Park | H04B 7/0456 |
| 2019/0349042 | A1* | 11/2019 | Ramireddy | H04B 7/0478 |

FOREIGN PATENT DOCUMENTS

| | | |
|---|---|---|
| CN | 104065448 A | 9/2014 |
| CN | 105991213 A | 10/2016 |
| CN | 106301506 A | 1/2017 |
| CN | 106330272 A | 1/2017 |
| CN | 106685497 A | 5/2017 |
| WO | 2015103752 A1 | 7/2015 |
| WO | 2016076785 A1 | 5/2016 |
| WO | 2017003208 A1 | 1/2017 |
| WO | 2017078611 A1 | 5/2017 |

OTHER PUBLICATIONS

3GPP TS 38.214 V1.0.0 (Sep. 2017), 3rd Generation Partnership Project; Technical Specification Group Radio Access Network; NR; Physical layer procedures for data (Release 15), Sep. 2017, 32 pages.
Intel Corporation, "Discussion on codebook subset restriction for NR," 3GPP TSG RAN WG1 #90, R1-1712546, Prague, Czech Republic, Aug. 21-25, 2017, 4 pages.
PCT International Search Report and Written Opinion issued in International Application No. PCT/CN2018/104805 dated Nov. 28, 2018, 11 pages (partial English translation).
Office Action issued in Chinese Application No. 201910526521.3 dated Feb. 14, 2020, 10 pages (with English translation).
Office Action issued in Chinese Application No. 201910527133.7 dated Feb. 14, 2020, 10 pages (with English translation).
Huawei et al., "Codebook Subset Restriction," 3GPP TSG RAN WG1 Meeting AH NR#3, R1-1715594; Nagoya, Japan, Sep. 18-21, 2017, 12 pages.
Extended European Search Report issued in European Application No. 18853237.8 dated Mar. 30, 2020, 8 pages.

* cited by examiner

CODEBOOK SUBSET RESTRICTION METHOD

CROSS-REFERENCE TO RELATED APPLICATIONS

This application is a continuation of International Application No. PCT/CN2018/104805, filed on Sep. 10, 2018, which claims priority to Chinese Patent Application No. 201710809290.8, filed on Sep. 10, 2017. The disclosures of the aforementioned applications are hereby incorporated by reference in their entireties.

TECHNICAL FIELD

Embodiments of the present invention relate to the communications field, and in particular, to a codebook subset restriction indication method, an apparatus, and a system.

BACKGROUND

Generally, a signal transmission model of a wireless communications system may be based on the following mathematical formula:

$$y = HWx + n,$$

where x represents a to-be-transmitted signal, H represents a channel matrix and is used to represent channel characteristics, W is a precoding matrix and is used to represent a matrix for precoding the to-be-transmitted data before the to-be-transmitted data is transmitted by using a channel H, n represents noise, and y represents a signal received at a receive end. The precoding matrix W is usually determined through measurement and feedback. For example, a process of determining a precoding matrix for downlink data may be as follows: A transmit end sends one or more reference signals; and a receive end measures the reference signals, and the receive end determines one or more precoding matrices based on measurement results of the reference signals. The receive end may send a precoding matrix indicator PMI to the transmit end based on the measurement results.

In an existing communications system and a next generation communications system, a multi-stage PMI feedback mechanism may be defined to reduce feedback overheads. To be specific, a precoding matrix W is a product of a first-stage feedback matrix $W_1$ and a second-stage feedback matrix $W_2$. W is a matrix with M rows and R columns. $W_1$ is a first-stage precoding matrix, and the matrix satisfies the following block diagonal structure:

$$W_1 = \begin{bmatrix} X^{(k)} & 0 \\ 0 & X^{(k)} \end{bmatrix} \in C^{M \times 2L}$$

Each diagonal block matrix $X^{(k)}$ is a matrix with M rows and L columns, and two diagonal blocks respectively correspond to ports in two polarization directions at a transmit end. $X^{(k)}$ is determined by the $k^{th}$ vector group or beam group selected in first-stage feedback, and a vector in each vector group is selected from a predefined vector set. $W_2$ is a matrix with 2L rows and R columns, and is used to select a vector from $X^{(k)}$ for each column of W, and determine a phase difference between the two polarized antenna ports. $W_1$ is a wideband parameter, to be specific, has a same value on all subbands within bandwidth used for communication between the transmit end and a receive end. $W_2$ is a subband parameter, to be specific, may have different values on different subbands within the bandwidth used for communication between the transmit end and the receive end. $W_1$ and $W_2$ are indicated by a first PMI 1 and a second PMI 2, respectively. After receiving a reference signal, the receive end reports a PMI 1 and a PMI 2 to the transmit end. The transmit end may respectively determine corresponding $W_1$ and $W_2$ based on the received PMI 1 and PMI 2, to determine a final precoding matrix. The transmit end may alternatively self-determine $W_1$ and $W_2$, to determine a final preceding matrix. Because some vectors in the predefined vector set cause relatively strong interference to a receive end in a neighboring cell, the transmit end may restrict, as required, a preceding matrix set that can be selected by the receive end when the receive end feeds back a preceding matrix. For example, available vectors in the predefined vector set may be restricted, and therefore the PMI 1 fed back by the receive end can only be a PMI 1 corresponding to an unrestricted vector. A restricted vector may be notified by the transmit end may to the receive end by using a bitmap (bitmap) in a field, where bits in the bitmap are in a one-to-one correspondence with vectors in the predefined vector set. The field that includes the bitmap is carried in signaling sent by the transmit end.

However, in the next generation communications system, a parameter type corresponding to the precoding matrix $W_1$ varies with R. For example, when R=1, 2, 5, 6, 7, or 8, a parameter corresponding to $W_1$ includes only a vector, and therefore a quantity of bits in the bitmap only needs to be greater than or equal to a quantity of vectors in the predefined vector set. When R=3 or R=4, in addition to a vector, $W_1$ further corresponds to an additional phase difference, the additional phase difference is selected from a predefined phase set, and the additional phase difference is a parameter different from the phase difference in W2. In this case, a combination of each vector and each phase difference needs to be jointly restricted in the bitmap, and therefore a quantity of bits in the bitmap is greater than or equal to a product of a quantity of vectors in the predefined vector set and a quantity of phase differences in the predefined phase set. Therefore, due to a plurality of bitmaps, a length of the field is greatly increased, and consequently signaling overheads are increased and air interface resources are wasted.

SUMMARY

Embodiments of the present invention provide a field transmission and representation method, an apparatus, and a system, to improve transmission efficiency, thereby saving air interface resources.

According to a first aspect, an embodiment of the present invention provides a field notification method, including: determining, by a base station, a first field, where the first field includes $T_1$ bits, at least one of the $T_1$ bits indicates at least two elements $\{b_{i0}, b_{i1}, \ldots, b_{ik}\}$ in a set B, the at least one bit further indicates at least one element $\{\theta_{j0}, \theta_{j1}, \ldots, \theta_{jh}\}$ in a set $\Phi$, and at least one element in $\{b_{i0}, b_{i1}, \ldots, b_{ik}\}$ and at least one element in $\{\theta_{j0}, \theta_{j1}, \ldots, \theta_{jh}\}$ are used to form a precoding matrix, where the set $\Phi = \{b_0, b_1, \ldots, b_{T_2-1}\}$, an element in the set $\Phi$ is a vector with a length of N/4, the set $\Phi = \{\theta_0, \theta_1, \ldots, \theta_{S-1}\}$, an element in $\Phi$ is a complex number of a unit amplitude, column 1 of the precoding matrix W satisfies $$W(l) = \begin{bmatrix} b_{k_l} \\ (-1)^l \theta_{p_l} b_{k_l} \\ \varphi_l b_{k_l} \\ (-1)^l \varphi_l \theta_{p_l} b_{k_l} \end{bmatrix},$$

a quantity of rows of W is N, a quantity of columns of W is R, N is greater than or equal to R, $b_{k_l}$ is an element in $\{b_{i0}, b_{i1}, \ldots, b_{ik}\}$, $\theta_{p_l}$ is an element in $\{\theta_{j0}, \theta_{j1}, \ldots, \theta_{jh}\}$, $\varphi_l$ is a complex number of a unit amplitude, $T_1$, $T_2$, and S are all positive integers, $T_1 < S*T_2$, and l is an integer greater than or equal to 0 and less than or equal to R−1; and sending, by the base station, the first field. As an optional implementation of the first aspect, the precoding matrix is a precoding matrix associated with the at least one bit.

In a first possible implementation of the first aspect, the first field is used to instruct user equipment to determine, from a first precoding matrix set with a rank of R, a subset of the first precoding matrix set, where the subset of the first precoding matrix set does not include a precoding matrix associated with a bit whose value is 0 in the T1 bits; or the subset of the first precoding matrix set does not include a precoding matrix associated with a bit whose value is 1 in the T1 bits.

In a second possible implementation of the first aspect, with reference to the first aspect and the first possible implementation, that at least one bit indicates at least two elements $\{b_{i0}, b_{i1}, \ldots, b_{ik}\}$ in a set B includes:

bit x of the $T_1$ bits indicates at least one element in B; and/or bit y of the $T_1$ bits indicates at least two elements in B, where x satisfies a condition:

$$\left\lfloor \frac{x}{K_2} \right\rfloor$$

is an even number, y satisfies a condition:

$$\left\lfloor \frac{y}{K_2} \right\rfloor$$

is an odd number, x and y are non-negative integers less than or equal to $T_1 - 1$, and $K_2$ is a positive integer less than $T_1$.

In a third possible implementation of the first aspect, with reference to the second possible implementation of the first aspect, an element indicated by bit $K_2*2p+m$ of the $T_1$ bits includes $b_{K_2p+m}$; and/or at least two elements indicated by bit $K_2*(2p+1)+m$ of the $T_1$ bits include $b_{K_2p+m}$, and $b_{K_2(p+1)+m}$, where p is a non-negative integer less than $T_1$, and m is a non-negative integer less than $K_2$.

In a fourth possible implementation of the first aspect, with reference to the first aspect and the first possible implementation, that at least one bit indicates at least two elements $\{b_{i0}, b_{i1}, \ldots, b_{ik}\}$ in a set B includes: bit x of the $T_1$ bits indicates at least three elements in B; and/or bit y of the $T_1$ bits indicates at least four elements in B, where x satisfies a condition:

$$\left\lfloor \frac{x}{K_2} \right\rfloor$$

is an even number, y satisfies a condition:

$$\left\lfloor \frac{y}{K_2} \right\rfloor$$

is an odd number, x and y are non-negative integers less than or equal to $T_1 - 1$, and $K_2$ is a positive integer less than $T_1$.

In a fifth possible implementation of the first aspect, with reference to the fourth possible implementation of the first aspect, elements indicated by bit $K_2*2p+m$ of the $T_1$ bits include $b_{K_2p+m}$, $b_{K_2 \times f(p-1)=m}$, and $b_{K_2 \times f(p+1)+m}$; and/or elements indicated by bit $K_2*(2p+1)+m$ of the $T_1$ bits include $b_{K_2p+m}$, $b_{K_2 \times f(p-1)+m}$, $b_{K_2 \times f(p+1)+m}$, and $b_{K_2 \times f(p+2)+m}$, where p is a non-negative integer less than $T_1$, m is a non-negative integer less than $K_2$, a function $$f(z) = z \bmod \left( \frac{1}{2} K_1 \right),$$

$K_1$ is an integer, and A mod B represents a remainder of division of an integer A by an integer B.

In a sixth possible implementation of the first aspect, with reference to the first aspect and the first to the fifth possible implementations of the first aspect, an element indicated by bit $K_2*r+m$ of the $T_1$ bits includes $\theta_{r \bmod S}$, where r is a non-negative integer less than $T_1$, m is a non-negative integer less than $K_2$, and A mod B represents a remainder of division of an integer A by an integer B.

In a seventh possible implementation of the first aspect, with reference to the first aspect and the first to the sixth possible implementations of the first aspect, a structure of W satisfies $$W = W_1 W_2, \quad W_1 = \begin{bmatrix} X \\ & X \end{bmatrix},$$

X is a matrix with N/2 rows and L columns, $W_2$ is a matrix with L rows and R columns, L is a positive integer, and an element in Φ and an element in B are used to form X.

In an eighth possible implementation of the first aspect, with reference to the possible implementations of the third aspect and the fifth aspect, an element in the set B is a two-dimensional DFT vector, and an element $b_{K_2q+n}$ in B satisfies $b_{K_2q+n} = v_q \otimes u_n$, where $v_q$ is a one-dimensional DFT vector with a length of $N_v$, $u_n$ is a one-dimensional DFT vector with a length of $N_u$, $N=4N_vN_u$, $N_v$ and $N_u$ are positive integers, ⊗ represents a Kronecker product, q is a non-negative integer less than $T_1$, and n is a non-negative integer less than $K_2$.

According to a second aspect, an embodiment of the present invention provides a field receiving method, including: receiving, by user equipment, a first field, where the first field includes $T_1$ bits, at least one of the $T_1$ bits indicates at least two elements $\{b_{i0}, b_{i1}, \ldots b_{ik}\}$ in a set B, the at least one bit further indicates at least one element $\{\theta_{j0}, \theta_{j1}, \ldots, \theta_{jh}\}$ in a set Φ, and at least one element in $\{b_{i0}, b_{i1}, \ldots, b_{ik}\}$ and at least one element in $\{\theta_{j0}, \theta_{j1}, \ldots, \theta_{jh}\}$ are used to form a precoding matrix, where the set B=$\{b_0, b_1, \ldots, b_{T_2-1}\}$, an element in the set B is a vector with a length of N/4, the set Φ=$\{\theta_0, \theta_1, \ldots, \theta_{S-1}\}$, an element in Φ is a complex number of a unit amplitude, column l of the precoding matrix W satisfies $$W(l) = \begin{bmatrix} b_{k_l} \\ (-1)^l \theta_{p_l} b_{k_l} \\ \varphi_l b_{k_l} \\ (-1)^l \varphi_l \theta_{p_l} b_{k_l} \end{bmatrix},$$

a quantity of rows of W is N, a quantity of columns of W is R. N is greater than or equal to R, $b_{k_l}$ is an element in $\{b_{i0}, b_{i1}, \ldots, b_{ik}\}$, $\theta_{p_l}$ is an element in $\{\theta_{j0}, \theta_{j1}, \ldots, \theta_{jh}\}$, $\varphi_l$ is a complex number of a unit amplitude, $T_1$, $T_2$, and S are all positive integers $T_1 \leq S^*T_2$, and l is an integer greater than or equal to 0 and less than or equal to R−1. As an optional implementation of the second aspect, the precoding matrix is a precoding matrix associated with the at least one bit.

In a first possible implementation of the second aspect, the user equipment determines, based on the first field from a first precoding matrix set with a rank of R, a subset of the first preceding matrix set, where the subset of the first precoding matrix set does not include a precoding matrix associated with a bit whose value is 0 in the T1 bits; or the subset of the first precoding matrix set does not include a precoding matrix associated with a bit whose value is 1 in the T1 bits.

In a second possible implementation of the second aspect, with reference to the second aspect and the first possible implementation, that at least one bit indicates at least two elements $\{b_{i0}, b_{i1}, \ldots, b_{ik}\}$ in a set B includes:

bit x of the $T_1$ bits indicates at least one element in B; and/or bit y of the $T_1$ bits indicates at least two elements in B, where x satisfies a condition:

$$\left\lfloor \frac{x}{K_2} \right\rfloor$$

is an even number, y satisfies a condition:

$$\left\lfloor \frac{y}{K_2} \right\rfloor$$

is an odd number, x and y are non-negative integers less than or equal to $T_1-1$, and $K_2$ is a positive integer less than $T_1$.

In a third possible implementation of the second aspect, with reference to the second possible implementation of the second aspect, an element indicated by bit $K_2*2p+m$ of the $T_1$ bits includes $b_{K_2p+m}$; and/or at least two elements indicated by bit $K_2*(2p+1)+m$ of the $T_1$ bits include $b_{K_2p+m}$ and $b_{K_2(p+1)+m}$, where p is a non-negative integer less than $T_1$, and m is a non-negative integer less than $K_2$.

In a fourth possible implementation of the second aspect, with reference to the second aspect and the first possible implementation, that at least one bit indicates at least two elements $\{b_{i0}, b_{i1}, \ldots, b_{ik}\}$ in a set B includes: bit x of the $T_1$ bits indicates at least three elements in B; and/or bit y of the $T_1$ bits indicates at least four elements in B, where x satisfies a condition:

$$\left\lfloor \frac{x}{K_2} \right\rfloor$$

is an even number, y satisfies a condition:

$$\left\lfloor \frac{y}{K_2} \right\rfloor$$

is an odd number, x and y are non-negative integers less than or equal to $T_1-1$, and $K_2$ is a positive integer less than $T_1$.

In a fifth possible implementation of the second aspect, with reference to the fourth possible implementation of the second aspect, elements indicated by bit $K_2*2p+m$ of the $T_1$ bits include $b_{K_2p+m}$, $b_{K_2 \times f(p-1)+m}$, and $b_{K_2 \times f(p+1)+m}$; and/or elements indicated by bit $K_2*(2p+1)+m$ of the $T_1$ bits include $b_{K_2p+m}$, $b_{K_2 \times f(p-1)+m}$, $b_{K_2 \times f(p+1)+m}$, and $b_{K_2 \times f(p+2)+m}$, where p is a non-negative integer less than $T_1$, m is a non-negative integer less than $K_2$, a function $$f(z) = z \bmod \left(\frac{1}{2} K_1\right),$$

$K_1$ is an integer, and A mod B represents a remainder of division of an integer A by an integer B.

In a sixth possible implementation of the second aspect, with reference to the second aspect and the first to the fifth possible implementations of the second aspect, an element indicated by bit $K_2*r+m$ of the $T_1$ bits includes $\theta_{r \bmod s}$, where r is a non-negative integer less than $T_1$, m is a non-negative integer less than $K_2$, and A mod B represents a remainder of division of an integer A by an integer B.

In a seventh possible implementation of the second aspect, with reference to the second aspect and the first to the sixth possible implementations of the second aspect, a structure of W satisfies $W=W_1W_2$, $$W_1 = \begin{bmatrix} X & \\ & X \end{bmatrix},$$

X is a matrix with N/2 rows and L columns, $W_2$ is a matrix with L rows and R columns, L is a positive integer, and an element in $\Phi$ and an element in B are used to form X.

In an eighth possible implementation of the second aspect, with reference to the possible implementations of the third aspect and the fifth aspect, an element in the set B is a two-dimensional DFT vector, and an element $b_{K_2q=n}$ in B satisfies $b_{K_2q+n}=v_q \otimes u_n$, where $v_q$ is a one-dimensional DFT vector with a length of $N_v$, $u_n$ is a one-dimensional DFT vector with a length of $N_u$, $N=4N_vN_u$, $N_v$ and $N_u$ are positive integers, $\otimes$ represents a Kronecker product, q is a non-negative integer less than $T_1$, and n is a non-negative integer less than $K_2$.

According to a third aspect, an embodiment of the present invention provides a base station, including a determining unit, configured to determine a first field, where the first field includes $T_1$ bits, at least one of the $T_1$ bits indicates at least two elements $\{b_{i0}, b_{i1}, \ldots, b_{ik}\}$ in a set B, the at least one bit further indicates at least one element $\{\theta_{j0}, \theta_{j1}, \ldots, \theta_{jh}\}$ in a set $\Phi$, and at least one element in $\{b_{i0}, b_{i1}, \ldots, b_{ik}\}$ and at least one element in $\{\theta_{j0}, \theta_{j1}, \ldots, \theta_{jh}\}$ are used to form a precoding matrix, where the set $B=\{b_0, b_1, \ldots, b_{T_2-1}\}$, an element in the set B is a vector with a length of N/4, the set $\Phi=\{\theta_0, f_1, \ldots, \theta_{S-1}\}$, an element in $\Phi$ is a complex number of a unit amplitude, column l of the precoding matrix W satisfies $$W(l) = \begin{bmatrix} b_{k_l} \\ (-1)^l \theta_{p_l} b_{k_l} \\ \varphi_l b_{k_l} \\ (-1)^l \varphi_l \theta_{p_l} b_{k_l} \end{bmatrix},$$

a quantity of rows of W is N, a quantity of columns of W is R, N is greater than or equal to R, $b_{k_l}$ is an element in $\{b_{i0}, b_{i1}, \ldots, b_{ik}\}$, $\theta_{p_l}$ is an element in $\{\theta_{j0}, \theta_{j1}, \ldots, \theta_{jh}\}$, $\theta_l$ is a complex number of a unit amplitude, $T_1$, $T_2$, and S are all positive integers, $T_1 < S*T_2$, and l is an integer greater than or equal to 0 and less than or equal to R−1; and a sending unit, configured to send the first field. As an optional implementation of the third aspect, the precoding matrix is a precoding matrix associated with the at least one bit.

In a first possible implementation of the third aspect, the first field is used to instruct user equipment to determine, from a first precoding matrix set with a rank of R, a subset of the first precoding matrix set, where the subset of the first precoding matrix set does not include a precoding matrix associated with a bit whose value is 0 in the T1 bits; or the subset of the first precoding matrix set does not include a precoding matrix associated with a bit whose value is 1 in the T1 bits.

In a second possible implementation of the third aspect, with reference to the third aspect and the first possible implementation, that at least one bit indicates at least two elements $\{b_{i0}, b_{i1}, \ldots, b_{ik}\}$ in a set B includes:

bit x of the $T_1$ bits indicates at least one element in B; and/or bit y of the $T_1$ bits indicates at least two elements in B, where x satisfies a condition:

$$\lfloor \frac{x}{K_2} \rfloor$$

is an even number, y satisfies a condition:

$$\lfloor \frac{y}{K_2} \rfloor$$

is an odd number, x and y are non-negative integers less than or equal to $T_1$−1, and $K_2$ is a positive integer less than $T_1$.

In a third possible implementation of the third aspect, with reference to the second possible implementation of the third aspect, an element indicated by bit $K_2*2p+m$ of the $T_1$ bits includes $b_{K_2p+m}$; and/or at least two elements indicated by bit $K_2*(2p+1)+m$ of the $T_1$ bits include $b_{K_2p+m}$ and $b_{K_2(p+1)+m}$, where p is a non-negative integer less than $T_1$, and m is a non-negative integer less than $K_2$.

In a fourth possible implementation of the third aspect, with reference to the third aspect and the first possible implementation, that at least one bit indicates at least two elements $\{b_{i0}, b_{i1}, \ldots, b_{ik}\}$ in a set B includes: bit x of the $T_1$ bits indicates at least three elements in B; and/or bit y of the $T_1$ bits indicates at least four elements in B, where x satisfies a condition:

$$\lfloor \frac{x}{K_2} \rfloor$$

is an even number, y satisfies a condition:

$$\lfloor \frac{y}{K_2} \rfloor$$

is an odd number, x and y are non-negative integers less than or equal to $T_1$−1, and $K_2$ is a positive integer less than $T_1$.

In a fifth possible implementation of the third aspect, with reference to the fourth possible implementation of the third aspect, elements indicated by bit $K_2*2p+m$ of the $T_1$ bits include $b_{K_2p+m}$, $b_{K_2 \times f(p-1)+m}$, and $b_{K_2 \times f(p+1)+m}$; and/or elements indicated by bit $K_2*(2p+1)+m$ of the $T_1$ bits include $b_{K_2p+m}$, $b_{K_2 \times f(p-1)+m}$, $b_{K_2 \times f(p+1)+m}$, and $b_{K_2 \times f(p+2)+m}$, where p is a non-negative integer less than $T_1$, m is a non-negative integer less than $K_2$, a function $$f(z) = z \bmod \left(\frac{1}{2} K_1\right),$$

$K_1$ is an integer, and A mod B represents a remainder of division of an integer A by an integer B.

In a sixth possible implementation of the third aspect, with reference to the third aspect and the first to the fifth possible implementations of the third aspect, an element indicated by bit $K_2*r+m$ of the $T_1$ bits includes $\theta_{r \bmod S}$, where r is a non-negative integer less than $T_1$, m is a non-negative integer less than $K_2$, and A mod B represents a remainder of division of an integer A by an integer B.

In a seventh possible implementation of the third aspect, with reference to the third aspect and the first to the sixth possible implementations of the third aspect, a structure of W satisfies $$W = W_1 W_2, \quad W_1 = \begin{bmatrix} X & \\ & X \end{bmatrix},$$

X is a matrix with N/2 rows and L columns, $W_2$ is a matrix with L rows and R columns, L is a positive integer, and an element in Φ and an element in B are used to form X.

In an eighth possible implementation of the third aspect, with reference to the possible implementations of the third aspect and the fifth aspect, an element in the set B is a two-dimensional DFT vector, and an element $b_{K_2q+n}$ in B satisfies $b_{K_2q+n} = v_q \otimes u_n$, where $v_q$ is a one-dimensional DFT vector with a length of $N_v$, $u_n$ is a one-dimensional DFT vector with a length of $N_u$, $N = 4N_v N_u$, $N_v$ and $N_u$ are positive integers, ⊗ represents a Kronecker product, q is a non-negative integer less than $T_1$, and n is a non-negative integer less than $K_2$.

According to a fourth aspect, an embodiment of the present invention provides user equipment, including: a receiving unit, configured to receive a first field, where the first field includes $T_1$ bits, at least one of the $T_1$ bits indicates at least two elements $\{b_{i0}, b_{i1}, \ldots, b_{ik}\}$ in a set B, the at least one bit further indicates at least one element $\{\theta_{j0}, \theta_{j1}, \ldots, \theta_{jh}\}$ in a set Φ, and at least one element in $\{b_{i0}, b_{i1}, \ldots, b_{ik}\}$ and at least one element in $\{\theta_{j0}, \theta_{j1}, \ldots, \theta_{jh}\}$ are used to form a precoding matrix, where the set $B = \{b_0, b_1, \ldots, b_{T_2-1}\}$, an element in the set B is a vector with a length of N/4, the set $\Phi = \{\theta_0, \theta_1, \ldots, \theta_{S-1}\}$, an element in Φ is a complex number of a unit amplitude, column l of the precoding matrix W satisfies $$W(l) = \begin{bmatrix} b_{k_l} \\ (-1)^l \theta_{p_l} b_{k_l} \\ \varphi_l b_{k_l} \\ (-1)^l \varphi_l \theta_{p_l} b_{k_l} \end{bmatrix},$$

a quantity of rows of W is N, a quantity of columns of W is R, N is greater than or equal to R, $b_{k_l}$ is an element in $\{b_{i0}, b_{i1}, \ldots, b_{ik}\}$, $\theta_{p_l}$ is an element in $\{\theta_{j0}, \theta_{j1}, \ldots, \theta_{jh}\}$, $\varphi_l$ is a complex number of a unit amplitude, $T_1$, $T_2$, and S are all positive integers, $T_1 < S*T_2$, and l is an integer greater than or equal to 0 and less than or equal to R−1. As an optional implementation of the fourth aspect, the precoding matrix is a precoding matrix associated with the at least one bit.

In a first possible implementation of the fourth aspect, the user equipment further includes a determining unit, configured to determine, based on the first field from a first precoding matrix set with a rank of R, a subset of the first precoding matrix set, where the subset of the first precoding matrix set does not include a precoding matrix associated with a bit whose value is 0 in the T1 bits, or the subset of the first precoding matrix set does not include a precoding matrix associated with a bit whose value is 1 in the T1 bits.

In a second possible implementation of the fourth aspect, with reference to the fourth aspect and the first possible implementation, that at least one bit indicates at least two elements $\{b_{i0}, b_{i1}, \ldots, b_{ik}\}$ in a set B includes:

bit x of the $T_1$ bits indicates at least one element in B; and/or bit y of the $T_1$ bits indicates at least two elements in B, where x satisfies a condition:

$$\left\lfloor \frac{x}{K_2} \right\rfloor$$

is an even number, y satisfies a condition:

$$\left\lfloor \frac{y}{K_2} \right\rfloor$$

is an odd number, x and y are non-negative integers less than or equal to $T_1-1$, and $K_2$ is a positive integer less than $T_1$.

In a third possible implementation of the fourth aspect, with reference to the second possible implementation of the fourth aspect, an element indicated by bit $K_2*2p+m$ of the $T_1$ bits includes $b_{K_2p+m}$; and/or at least two elements indicated by bit $K_2*(2p+1)+m$ of the $T_1$ bits include $b_{K_2p+m}$ and $b_{K_2(p-1)+m}$, where p is a non-negative integer less than $T_1$, and m is a non-negative integer less than $K_2$.

In a fourth possible implementation of the fourth aspect, with reference to the fourth aspect and the first possible implementation, that at least one bit indicates at least two elements $\{b_{i0}, b_{i1}, \ldots, b_{ik}\}$ in a set B includes: bit x of the $T_1$ bits indicates at least three elements in B; and/or bit y of the $T_1$ bits indicates at least four elements in B, where x satisfies a condition:

$$\left\lfloor \frac{x}{K_2} \right\rfloor$$

is an even number, y satisfies a condition:

$$\left\lfloor \frac{y}{K_2} \right\rfloor$$

an odd number, x and y are non-negative integers less than or equal to $T_1-1$, and $K_2$ is a positive integer less than $T_1$.

In a fifth possible implementation of the fourth aspect, with reference to the fourth possible implementation of the fourth aspect, elements indicated by bit $K_2*2p+m$ of the $T_1$ bits include $b_{K_2p+m}$, $b_{K_2\times f(p-1)+m}$, and $b_{K_2\times f(p+1)+m}$; and/or elements indicated by bit $K_2*(2p+1)+m$ of the $T_1$ bits include $b_{K_2p+m}$, $b_{K_2\times f(p-1)+m}$, $b_{K_2\times f(p+1)+m}$, and $b_{K_2\times f(p+2)+m}$, where p is a non-negative integer less than $T_1$, m is a non-negative integer less than $K_2$, a function $$f(z) = z \bmod \left(\frac{1}{2} K_1\right),$$

$K_1$ is an integer, and A mod B represents a remainder of division of an integer A by an integer B.

In a sixth possible implementation of the fourth aspect, with reference to the fourth aspect and the first to the fifth possible implementations of the fourth aspect, an element indicated by bit $K_2*r+m$ of the $T_1$ bits includes $\theta_{r \bmod s}$, where r is a non-negative integer less than $T_1$, m is a non-negative integer less than $K_2$, and A mod B represents a remainder of division of an integer A by an integer B.

In a seventh possible implementation of the fourth aspect, with reference to the fourth aspect and the first to the sixth possible implementations of the fourth aspect, a structure of W satisfies $W=W_1W_2$, $$W_1 = \begin{bmatrix} X & \\ & X \end{bmatrix},$$

X is a matrix with N/2 rows and L columns, $W_2$ is a matrix with L rows and R columns, L is a positive integer, and an element in Φ and an element in B are used to form X.

In an eighth possible implementation of the fourth aspect, with reference to the possible implementations of the third aspect and the fifth aspect, an element in the set B is a two-dimensional DFT vector, and an element $b_{K_2q+n}$ in B satisfies $b_{K_2q+n}=v_q \otimes u_n$, where $v_q$ is a one-dimensional DFT vector with a length of $N_v$, $u_n$ is a one-dimensional DFT vector with a length of $N_u$, $N=4N_vN_u$, $N_v$ and $N_u$ are positive integers, ⊗ represents a Kronecker product, q is a non-negative integer less than $T_1$, and n is a non-negative integer less than $K_2$.

According to a fifth aspect, the present invention provides a base station device, configured to implement the first aspect of the present invention and the implementations of the first aspect. The base station includes a processor and a transmitter.

According to a sixth aspect, the present invention provides user equipment, configured to implement the second aspect of the present invention and the implementations of the second aspect. The user equipment includes a receiver and a processor.

According to a seventh aspect, the present invention provides a system, including a base station device and user equipment. The base station device may be the apparatus described in the third aspect or the fifth aspect of the present invention, and the user equipment may be the apparatus described in the fourth aspect or the sixth aspect of the present invention.

With reference to an eighth aspect, the present invention provides a chip. The chip includes a transmitter and a calculation module, and is configured to implement the methods in the first aspect and the second aspect of the present invention. The chip may also be used as the processor in the fifth aspect and the sixth aspect.

According to the foregoing implementations, a problem that bits are wasted because excessive bits are occupied during notification of the first field can be resolved, so that channel resources are saved.

DESCRIPTION OF EMBODIMENTS

A network architecture and a service scenario described in the embodiments of the present invention are intended to describe the technical solutions in the embodiments of the present invention more clearly, and do not constitute a limitation on the technical solutions provided in the embodiments of the present invention. A person of ordinary skill in the art may know that, with the evolution of the network architecture and the emergence of new service scenarios, the technical solutions provided in the embodiments of the present invention are also applicable to similar technical problems.

Figure 1:
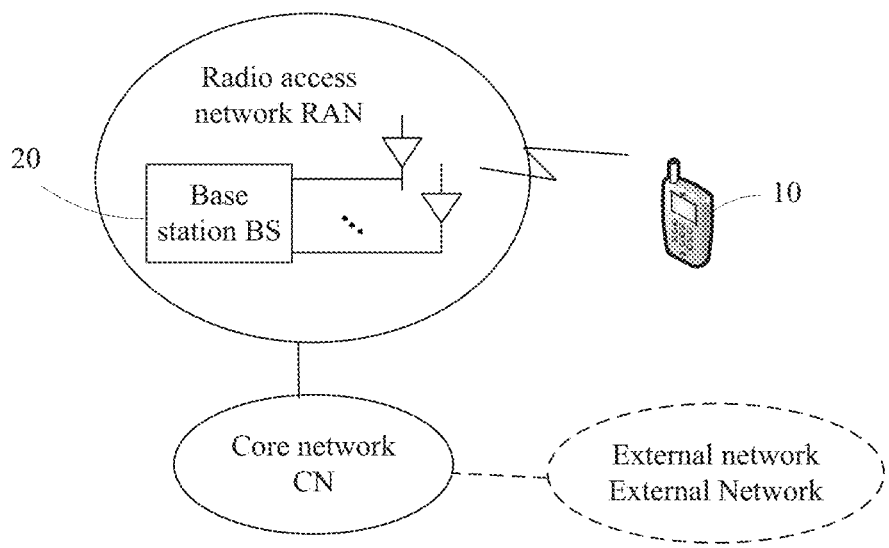
FIG. 1 is a schematic diagram of a system network according to an embodiment of the present invention.

FIG. 1 is a schematic diagram of a possible system network according to the present invention. As shown in FIG. 1, at least one user equipment UE 10 communicates with a radio access network (RAN). The RAN includes at least one base station (base station, BS for short) 20. For clarity, only one base station and one user equipment are shown in FIG. 1. The RAN is connected to a core network (CN). Optionally, the CN may be coupled to one or more external networks (external network), for example, the Internet or a public switched telephone network (PSTN).

For ease of understanding, some terms in this application are described below.

In this application, the terms "network" and "system" are often used interchangeably, but a person skilled in the art may understand meanings thereof. User equipment (UE) is a terminal device having a communication function, and may include a handheld device, an in-vehicle device, a wearable device, or a computing device having a wireless communication function, another processing device connected to a wireless modem, or the like. The user equipment may have different names in different networks, for example, a terminal, a mobile station, a subscriber unit, a station, a cellular phone, a personal digital assistant, a wireless modem, a wireless communications device, a handheld device, a laptop computer, a cordless phone, and a wireless local loop station. For ease of description, in this application, these devices are simply referred to as user equipment or UE. A base station (base station, BS for short) may also be referred to as a base station device, and is a device deployed in a radio access network to provide a wireless communication function. The base station may have different names in different radio access systems. For example, a base station in a universal mobile telecommunications system UMTS ( ) network is referred to as a NodeB, and a base station in an LTE network is referred to as an evolved NodeB.

In a system using a multiple-input multiple-output (Multiple Input Multiple Output, MIMO) technology, data or other information is sent by using a plurality of transmit antennas and/or a plurality of receive antennas, so that the data or other information can be transmitted at a higher rate. When a base station is used as a transmit end of a signal, and user equipment is used as a receive end, the base station needs to obtain channel information. A PMI may be used as one type of such information, and is fed back by the user equipment to the base station device.

The user equipment may determine the PMI by measuring a reference signal.

Generally, there are a plurality of types of reference signals. For example, a channel state information-reference signal CSI-RS, a sounding reference signal SRS, or a demodulation reference signal DMRS may be used for measurement; or other reference signals, other signals, or a combination of various signal types may be used for measurement. The user equipment determines channel state information by measuring the reference signal, determines one or more precoding matrices (also referred to as codewords) from a predefined precoding matrix set (also referred to as a codebook), and reports, to the base station, a PMI or PMIs corresponding to the one or more precoding matrices.

After receiving the PMI, the base station may determine, based on the PMI, a precoding matrix for downlink data or a precoding matrix for other downlink information. Under special circumstances, alternatively, the precoding matrix corresponding to the PMI may be used merely for reference or may not be used to precode the downlink data or other downlink information.

The following specifically describes implementations of the present invention with reference to specific examples. In the embodiments of the present invention, the base station may be a network device. It should be understood that, the present invention may also support a device-to-device scenario. In this scenario, the base station may be user equipment or another type of relay.

Figure 2:
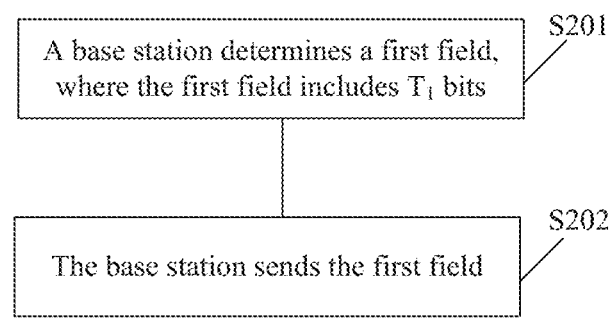
FIG. 2 is a schematic flowchart of a signaling receiving method according to an embodiment of the present invention.

The following specifically describes the implementations of the present invention based on the method shown in FIG. 2.

In multi-stage PMI feedback, a precoding matrix W may be formed by $W_1$ and $W_2$. The user equipment sends PMIs to the base station, to indicate $W_1$ and $W_2$. The user equipment may notify the base station of $W_1$ and $W_2$ by feeding back multi-stage PMIs, for example, feeding back a PMI 1 and a PMI 2, where the PMI 1 indicates $W_1$, and the PMI 2 indicates $W_2$. The base station can determine the precoding matrix W based on $W_1$ and $W_2$. Alternatively, both the PMI 1 and the PMI 2 may be associated with $W_1$, the base station determines $W_1$ based on the PMI 1 and the PMI 2, and the user equipment implicitly or explicitly indicates $W_2$ in another manner. Alternatively, a plurality of PMIs may respectively correspond to different $W_1$ and $W_2$. It should be understood that, "associated" herein may mean that the PMI 1 directly indicates an index of $W_1$.

In one feedback manner, a form of $W_1$ is unrelated to a value of a rank indication RI. In other words, $W_1$ is in a same form for all possible values of R. In this case, the PMI 1 includes a same parameter type.

In another feedback manner, a form of $W_1$ is associated with a value of a rank indication RI. Because the form of $W_1$ varies with a value of R, the PMI 1 also includes different parameters. In an embodiment, when the value of R is an element in a set A, $W_1$ is determined by a vector group. Therefore, the PMI 1 needs to indicate an index of the vector group, and the base station may determine the precoding matrix $W_1$ based on the index of the vector group. When the value of R is an element in a set C, $W_1$ is determined by a vector group and a phase. Therefore, the PMI 1 needs to indicate an index of the vector group and an index of the phase, and the base station determines the precoding matrix $W_1$ based on the index of the vector group and the index of the phase. It should be understood that, a specific calculation method is not limited in the present invention. It should be understood that, the base station and the user equipment each may determine the value of R in various manners. This is not limited in the present invention. In an embodiment, after determining the value of R, the user equipment may determine a precoding matrix indicator based on the value of R and a measurement process, and notify the base station of the PMI and the value of R, and the base station determines a precoding matrix based on the value of R and the PMI. In an embodiment, any element in the set A is different from any element in the set C.

As an embodiment, the precoding matrix W satisfies $W=W_1W_2$. W has N rows and R columns, $W_1$ satisfies the following structure:

$$W_1 = \begin{bmatrix} X^{(k)} & 0 \\ 0 & X^{(k)} \end{bmatrix} \in C^{N \times 2L},$$

and $W_2$ is a matrix with 2L rows and R columns.

For some values of R (for example, R is equal to 1, 2, 5, 6, 7, or 8), a structure of $X^{(k)}$ satisfies $$X^{(k)} = [b'_{s_1}, b'_{s_2}, \ldots, b'_{s_L}] \in C^{\frac{N}{2} \times L},$$

where $b'_{s_1}, b'_{s_2}, \ldots, b'_{s_L}$ is a vector group selected from a predefined vector set $B_1=\{b'_0, b'_1, \ldots, b'_{T_1}\}$, and the vector group includes L vectors. Each element in $B_1$ is a vector with a length of N/2. A vector grouping manner in the vector set $B_1$ may be predefined. For example, if each vector group includes only one vector, in other words, L=1, $X^{(k)}=[b'_k]$; or if each vector group includes L=2 vectors, and the $i^{th}$ vector group includes vectors $b'_{2(i-1)}$ and $b'_{2i-1}$, $X^{(k)}=[b'_{2(i+1)}, b'_{2i-1}]$. L may alternatively be another value, and is not limited herein. In such a structure of $X^{(k)}$, the PMI 1 only needs to indicate an index of the vector group. The base station determines the vector group based on the PMI 1, to determine the matrix $W_1$.

For some other values of the R (for example, R is equal to 3 or 4), a structure of $X^{(k)}$ satisfies $$X^{(k)} = \begin{bmatrix} X_1^{(k)} \\ \theta_k X_1^{(k)} \end{bmatrix} \in C^{\frac{N}{2} \times L},$$

where a structure of $X_1^{(k)}$ satisfies $X_1^{(k)}=[b_{s_1}, b_{s_2}, \ldots, b_{s_L}] \in C^{N/4 \times L}$, and $b_{s_1}, b_{s_2}, \ldots, b_{s_L}$ is a vector group selected from a predefined vector set $B_2=\{b_0, b_1, \ldots, b_{T_2}\}$. Each element in $B_2$ is a vector with a length of N/4. A vector grouping manner in the vector set $B_2$ may be predefined. A specific manner is the same as the foregoing vector grouping manner in $B_1$, and details are not described again. $\theta_k$ is an element in a predefined phase set $\Phi$. Each element in the phase set $\Phi$ is a complex number of a unit amplitude. In such a structure of $X^{(k)}$, the PMI 1 needs to indicate two indexes: an index of the vector group $X_1^{(k)}$ and an index of the phase $\theta_k$. In an implementation, the PMI 1 represents a $PMI_{1,1}$ and a $PMI_{1,2}$, where the $PMI_{1,1}$ indicates the index of the vector group $X_1^{(k)}$, and the $PMI_{1,2}$ indicates the index of the phase $\theta_k$. The base station determines the matrix $W_1$ based on the $PMI_{1,1}$ and the $PMI_{1,2}$.

It should be understood that, a process of determining W by the base station may be: first determining $W_1$ and $W_2$ and then determining W; or may be: determining W directly through table lookup based on a PMI; or may be: determining W in another manner. This is not limited in the present invention. Because the base station determines the precoding matrix for the purpose of precoding data, a process of determining and calculating a matrix is described in the present invention, and W that is obtained through calculation may be an array. The foregoing description of the structure of the precoding matrix may also be elements of the matrix and an arrangement rule of the elements. For example, for a matrix of the following structure:

$$W_1 = \begin{bmatrix} X^{(k)} & 0 \\ 0 & X^{(k)} \end{bmatrix},$$

after obtaining a PMI, the base station may simply store $X^{(k)}$ after determining $X^{(k)}$, and directly calculate a block matrix when $W=W_1W_2$ needs to be calculated.

In the foregoing scenario, the user equipment may usually determine the PMI from one or more precoding matrix sets based on a measurement result or according to another rule, for example, select the PMI from the precoding matrix set based on the measurement result, or directly determine the PMI from a PMI set based on the measurement result, or may determine the PMI from a precoding vector set based on the measurement result. As another embodiment, the PMI may alternatively be determined from the foregoing precoding vector set B and the set θ.

To avoid interference between different cells, or for another purpose, a range within which the user equipment selects a precoding matrix may be narrowed through codebook set restriction. Specifically, this may be implemented by restricting selection of the PMI 1 and/or restricting selection of the PMI 2.

In an embodiment, in step S201, a base station determines a first field, where the first field includes $T_1$ bits, at least one of the $T_1$ bits indicates at least two elements $\{b_{i0}, b_{i1}, \ldots, b_{ik}\}$ in a set B, the at least one bit further indicates at least one element $\{\theta_{j0}, \theta_{j1}, \ldots, \theta_{jh}\}$ in a set $\Phi$, at least one element in $\{b_{i0}, b_{i1}, \ldots, b_{ik}\}$ and at least one element in $\{\theta_{j0}, \theta_{j1}, \ldots, \theta_{jh}\}$ are used to form a precoding matrix, and the precoding matrix is a precoding matrix associated with the at least one bit.

The set $B=\{b_0, b_1, \ldots, b_{T_2-1}\}$, an element in the set B is a vector with a length of N/4, the set $\Phi=\{\theta_0, \theta_1, \ldots, \theta_{S-1}\}$, an element in $\Phi$ is a complex number of a unit amplitude, column l of the precoding matrix W satisfies $$W(l) = \begin{bmatrix} b_{k_l} \\ (-1)^l \theta_{p_l} b_{k_l} \\ \varphi_l b_{k_l} \\ (-1)^l \varphi_l \theta_{p_l} b_{k_i} \end{bmatrix},$$

a quantity of rows of W is N, a quantity of columns of W is R. N is greater than or equal to R, $b_{k_l}$ is an element in $\{b_{i0}, b_{i1}, \ldots, b_{ik}\}$, $\theta_{p_l}$ is an element in $\{\theta_{j0}, \theta_{j1}, \ldots, \theta_{jh}\}$, $\varphi_l$ is a complex number of a unit amplitude, $T_1$, $T_2$, and S are all positive integers, $T_1 S^* T_2$, and l is an integer greater than or equal to 0 and less than or equal to R−1.

In step S201, the first field includes the $T_1$ bits. With different ranks R, a same bit of the $T_1$ bits may have different meanings. For example, when a value of R belongs to a first set, at least one of the $T_1$ bits indicates at least two elements $\{b_{i0}, b_{i1}, \ldots, b_{ik}\}$ in the vector set B, and the at least one bit further indicates at least one element $\{\theta_{j0}, \theta_{j1}, \ldots, \theta_{jh}\}$ in the phase set $\Phi$, at least one element in $\{b_{i0}, b_{i1}, \ldots, b_{ik}\}$ and at least one element in $\{\theta_{j0}, \theta_{j1}, \ldots, \theta_{jh}\}$ are used to form a precoding matrix with the value of R, and a quantity of columns of the precoding matrix is R. Therefore, the precoding matrix may be referred to as a precoding matrix associated with the at least one bit. When the value of R does not belong to the first set, in an embodiment, each of the $T_1$ bits indicates one element in a set $B_1$. In another embodiment, the $T_1$ bits are in a one-to-one correspondence with elements in the set $B_1$. An element in $B_1$ is used to form a precoding matrix with the value of R A precoding matrix formed by an element indicated by each bit may be referred to as a precoding matrix associated with the bit. In an implementation, the set B varies with the value of R. For example, the set $B_1$ is different from the set B. In an embodiment, a parameter forming a precoding matrix varies with the value of R. For example, in the foregoing example, when the value of R belongs to the first set, parameters forming the precoding matrix include the element in the vector set B and the element in the phase set $\Phi$. When the value of R does not belong to the first set, a parameter forming the precoding matrix includes the element in the vector set $B_1$, and does not include an element in the phase set $\Phi$. In another implementation, a same set B is used for different values of R.

The following describes the content, in step S201, that at least one element in $\{b_{i0}, b_{i1}, \ldots, b_{ik}\}$ and at least one element in $\{\theta_{j0}, \theta_{j1}, \ldots, \theta_{jh}\}$ are used to form a precoding matrix, and the precoding matrix is a precoding matrix associated with the at least one bit.

A precoding matrix formed by a vector element b and a phase element θ indicates that a column or several columns of the precoding matrix is/are formed by both the element b and the element θ, and the element b and the element θ are parameters in $W_1$. In an embodiment, the parameters in $W_1$ may represent channel wideband characteristics, in other words, may be wideband parameters. It is assumed that b is an element in the set B or b is an element in $\{b_{i0}, b_{i1}, \ldots, b_{ik}\}$, and it is assumed that θ is an element in the set $\Phi$ or θ is an element in $\{\theta_{j0}, \theta_{j1}, \ldots, \theta_{jh}\}$. In other words, if any column of a precoding matrix includes both a vector element b and a phase element θ, and the element b and the element θ are parameters in $W_1$, the precoding matrix is formed by the two elements. If a bit indicates both a vector element b and a phase element θ, a precoding matrix formed by b and θ is a precoding matrix associated with the bit. One element b and one element θ may form a plurality of precoding matrices with a rank of R. For example, one element b and one element θ may form two precoding matrices each with a rank of 2: Wa and Wb, where the first column of Wa is formed by b and θ, and the second column of Wb is formed by b and θ. b and θ may alternatively form a precoding matrix Wc with a rank of 3, where the first two columns of Wc are both formed by b and θ, and the third column of Wc is not formed by b or θ. In addition to b and θ, the foregoing column or several columns of the precoding matrix may be further formed by another element, for example, a subband parameter in $W_2$. This is not limited herein. In an embodiment, for some values of R, a precoding matrix is formed by a vector parameter and a phase parameter. Optionally, for a specific manner of forming a precoding matrix by a vector parameter and a phase parameter, refer to an example in Formula (3).

For some other values of R, a parameter forming a precoding matrix does not include a phase parameter θ but includes only a vector parameter b', and b' is an element in a predefined vector set B'. Optionally, B' is different from B. In other words, with these values of R, a parameter forming $W_1$ of the precoding matrix does not include a phase parameter but includes only a vector parameter. In this case, forming a precoding matrix by a vector parameter b' indicates that a column or several columns of the precoding matrix is/are formed by the element b'. If a bit indicates a vector element b', a precoding matrix formed by b' is a precoding matrix associated with the bit. It should be noted that, one element b' may form a plurality of precoding matrices with a rank of R. Details are similar to those in the foregoing example, and are not described again. Optionally, for a specific manner of forming a precoding matrix by a vector parameter, refer to an example in Formula (4).

In an embodiment, the $T_1$ bits are used to instruct user equipment to determine, from a first precoding matrix set with a rank of R, a subset of the first precoding matrix set, where the subset of the first precoding matrix set does not include a precoding matrix associated with a bit whose value is 0 in the T1 bits, or the subset of the first precoding matrix set does not include a precoding matrix associated with a bit whose value is 1 in the T1 bits.

In an embodiment, all precoding matrices with a rank of R that are formed based on the predefined vector set $B=\{b_0, b_1, \ldots, b_{T_2-1}\}$ and the predefined phase set $\Phi=\{\theta_0, \theta_1, \ldots, \theta_{S-1}\}$ according to a predefined method form the first precoding matrix set with the rank of R, which may also be referred to as a codebook with a rank of R. An element in the vector set B and an element in the phase set Φ are used to form $W_1$ of the precoding matrix. The $T_1$ bits are used to prevent a combination of some vector elements and some phase elements from being used to form $W_1$, to prevent a PMI 1 corresponding to $W_1$ formed by the combination of these elements from being reported by the user equipment. Therefore, a precoding matrix W formed by a restricted $W_1$ cannot be used, and the precoding matrix cannot be included in the subset of the first precoding matrix set. In other words, a precoding matrix included in the subset of the first precoding matrix set is an available precoding matrix, namely, an unrestricted precoding matrix. No column of the precoding matrix is formed by a restricted combination of a vector element and a phase element. In an embodiment, a bit whose value is 0 indicates that a precoding matrix associated with the bit is restricted. In another embodiment, a bit whose value is 1 indicates that a precoding matrix associated with the bit is restricted.

It should be noted that, in an embodiment, for some values of R, which are referred to as a first value set for convenience, a precoding matrix is formed by a vector parameter b and a phase parameter. For some other values of R, which are referred to as a second value set for convenience, a parameter forming a precoding matrix does not include a phase parameter θ but includes only a vector parameter b'. The set B from which b is selected is different from the set B' from which b' is selected. When R belongs to the second value set, all precoding matrices with a rank of R that are formed based on the predefined vector set B' according to a predefined method form the first precoding matrix set with the rank of R, which may also be referred to as a codebook with a rank of R. The vector set B' forms $W_1$ of the precoding matrix. In this case, codebook subset restriction is used to prevent some vector elements from being used to form $W_1$, to prevent a $PMI_1$ corresponding to $W_1$ formed by these elements from being reported by the user equipment. Therefore, a precoding matrix W formed by a restricted $W_1$ cannot be used, and the precoding matrix cannot be included in the subset of the first precoding matrix set. In other words, a precoding matrix included in the subset of the first precoding matrix set is an available precoding matrix, namely, an unrestricted precoding matrix. No column of the precoding matrix is formed by a restricted vector element in B'. In an embodiment, a bit whose value is 0 indicates that a precoding matrix associated with the bit is restricted. In another embodiment, a bit whose value is 1 indicates that a precoding matrix associated with the bit is restricted.

The following describes the foregoing indication relationship by giving several specific examples based on step S201.

As an overall solution, the $T_1$ bits in the first field may be referred to as a bitmap (bitmap). In this embodiment, a parameter forming the precoding matrix and the vector set B vary with a value of R. Therefore, for different values of R, a same bit in the bitmap has different meanings. For example, the value of R may be set to a positive integer less than or equal to $R_{max}$, a set Set 1 may be set to a proper subset of a set $\{1, 2, \ldots, R_{max}\}$, a set Set 2 may be set to a proper subset of the set $(1, 2, \ldots, R_{max})$, and an intersection set of Set 1 and Set 2 be set to an empty set. In an embodiment, for all possible values of R, a structure of the precoding matrix is always the foregoing double codebook structure: $W=W_1W_2$, where $W_1$ is in a block diagonal structure. In an embodiment, $W_1$ may represent a wideband parameter, and when the user equipment reports a PMI, selection of $W_1$ is indicated by a PMI 1. In an embodiment, $W_2$ may represent a subband parameter, and when the user equipment reports a PMI, selection of $W_2$ is indicated by a PMI 2.

Case 1: When R belongs to Set 1, the precoding matrix W with a rank of R is formed by only a vector element. To be specific, $W_1$ of W is formed by only a vector element. In this case, each bit in the bitmap indicates only a vector in the predefined vector set B'. For example, the bits are in a one-to-one correspondence with vectors. For example, if the vector set B' includes eight elements {d0, d1, d2, d3, d4, d5, d6, d7}, the bitmap includes $T_1$=8 bits. Optionally, an indication relationship between the $T_1$ bits and the elements in the set B' is shown in Table 1:

TABLE 1

| Bit | BIT 0 | BIT 1 | BIT 2 | BIT 3 | BIT 4 | BIT 5 | BIT 6 | BIT 7 |
|---|---|---|---|---|---|---|---|---|
| Indicated element | d0 | d1 | d2 | d3 | d4 | d5 | d6 | d7 |

Therefore, a precoding matrix with a rank of R that is formed by an element dk indicated by bit k is referred to as a precoding matrix with a rank of R that is associated with the bit, where k=0, 1, . . . , 7. Optionally, for a specific manner of forming a precoding matrix by a vector parameter, refer to an example in Formula (4).

As an embodiment, when the base station determines that the bitmap is 11011100, it means that d2, d6, and d7 are restricted. It is assumed herein that a bit whose value is 0 indicates that an associated precoding matrix is restricted. Therefore, in this embodiment, a precoding matrix with a rank of R that is formed by any one or more of the restricted elements d2, d6, and d7 is restricted. When the user equipment reports a PMI 1, the bitmap indicates that a PMI 1 corresponding to $W_1$ formed by a restricted element cannot be reported.

Case 2: When R belongs to Set 2, the precoding matrix W with a rank of R is formed by a vector element and a phase element. To be specific, $W_1$ of the precoding matrix W is determined by a vector parameter and a phase parameter. Optionally, for a specific manner of forming a precoding matrix by a vector parameter, refer to an example in Formula (4). As an embodiment, each bit in the bitmap not only indicates one or more vectors in the predefined vector set B, but also indicates a phase parameter in the predefined phase set Φ. For example, the set B includes eight elements {b0, b1, b2, b3, b4, b5, b6, b7}, and the set Φ includes two elements {θ0, θ1}. In this case, the first field may be a bitmap with $T_1$=8 bits. The $T_1$ bits and the associated elements in the set B may be shown in Table 2:

TABLE 2

| BIT 0 | BIT 1 | BIT 2 | BIT 3 | BIT 4 | BIT 5 | BIT 6 | BIT 7 |
|---|---|---|---|---|---|---|---|
| d0 d1 θ0 | d0 θ1 | d2 d3 θ0 | d2 θ1 | d4 d5 θ0 | d4 θ1 | d6 d7 θ0 | d6 θ1 |

According to an indication relationship shown in Table 2, bits 0, 2, 4, and 6 each indicate at least two elements in the set B. For example, bit 4 indicates d4 and d5. For example, when the base station determines that the bitmap is {11110111}, a precoding matrix with a rank of R that is formed by a combination of d4 and θ0 is restricted, and a preceding matrix with a rank of R that is formed by a combination of d5 and θ0 is restricted. When the user equipment reports a PMI 1, the bitmap indicates that a PMI 1 corresponding to $W_1$ formed by restricted elements cannot be reported.

In the foregoing embodiments, for different values of R, the bitmap indicates an element in the set Φ and an element in the set B, or indicates an element in the set B'. For different values of R, the set B may be different from the set B'. For different values of R, the precoding matrix has different structures. Specific forms of Φ and B and a specific form of W are not limited in the present invention. An optional form of Φ, B, and the precoding matrix W is described below by using a specific example.

In an embodiment, an element $b_i$ in the set B is a one-dimensional DFT vector. For example, a one-dimensional DFT vector d, with a length of N' may be expressed in the following formula:

$$d_i = \begin{bmatrix} 1 \\ e^{j2\pi \frac{i}{N'O}} \\ \vdots \\ e^{j2\pi \frac{(N'-1)i}{N'O}} \end{bmatrix}, \quad (1)$$

where i is a positive integer less than or equal to N'O−1. N' is a length of a vector $b_i$, and O is a positive integer. Optionally, for an element in the set B, $b_i = d_i$, and $$N' = \frac{N}{4},$$

where i=0, 1, . . . , $T_2-1$, $T_2=$N'O, and $T_2$ is a quantity of elements in the set B.

In another embodiment, an element $b_i$ in the set B is a two-dimensional DFT vector. For example, a two-dimensional DFT vector d, with a length of N' may be expressed in the following formula:

$d_i = v_{l_i} \otimes u_{m_i}$, where $v_{l_i}$ and $u_{m_i}$ are respectively a one-dimensional DFT column vector with a length of $N'_1$ and a one-dimensional DFT column vector with a length of $N'_2$, and $N'_1$ and $N'_2$ satisfy: $N' = N'_1 N'_2$. ⊗ represents a Kronecker product (Kronecker product). In an embodiment, $$v_{l_i} = \begin{bmatrix} 1 & e^{j2\pi \frac{l_i}{N'_1 O_1}} & \cdots & e^{j2\pi \frac{(N'_1-1)l_i}{N'_1 O_1}} \end{bmatrix}^T, \text{and}$$

$$u_{m_i} = \begin{bmatrix} 1 & e^{j2\pi \frac{m_i}{N'_2 O_2}} & \cdots & e^{j2\pi \frac{(N'_2-1)m_i}{N'_2 O_2}} \end{bmatrix}^T,$$

where $a^T$ represents a transposed form of a vector a, $m_i$ is a non-negative integer less than or equal to $N'_2 O_2-1$, and $l_i$ is a non-negative integer less than or equal to $N'_1 O_1-1$, and therefore:

$$d_i = \begin{bmatrix} u_{m_i} \\ e^{j2\pi \frac{l_i}{N'_1 O_1/2}} u_{m_i} \\ \vdots \\ e^{j2\pi \frac{(N'_1-1)l_i}{N'_1 O_1}} u_{m_i} \end{bmatrix} \quad (2)$$

In this case, there are $N'_1 N'_2 O_1 O_2$ vectors $d_i$ in total, where $N'_1, N'_2, O_1, O_2$ are all positive integers. Optionally, a relationship between a subscript i of $d_i$ and subscripts $l_i$ and $m_i$ is: $i = N'_2 O_2 l_i + m_i$. Optionally, a relationship between a subscript i of $d_i$ and subscripts $l_i$ and $m_i$ may be: $i = N'_1 O_1 m_i + l_i$. Therefore, the two-dimensional DFT vector $d_i$ may also be written as $d_{l_i, m_i}$. For an element in the set B, $b_i = d_i$, and $$N' = \frac{N}{4}.$$

There are $T_2 = N'_1 N'_2 O_1 O_2$ elements in the set B in total, where i=0, 1, . . . , $T_2-1$. In subsequent analysis, the two-dimensional DFT vector $b_i$ is equivalent to $b_{l_i, m_i}$. In other words, the two representation manners are equivalent.

As described above, the structure of the precoding matrix may vary with R.

In an embodiment, when the value of R belongs to Set 2, column 1 of W satisfies:

$$W(l) = \begin{bmatrix} b_{k_l} \\ (-1)^l \theta_{p_l} b_{k_l} \\ \varphi_l b_{k_l} \\ (-1)^l \varphi_l \theta_{p_l} b_{k_l} \end{bmatrix} \in C^{N \times 1} \quad (3)$$

A quantity of rows of W is N, a quantity of columns of W is R, N is greater than or equal to R $b_{k_l}$ is an element in the set B={$b_0, b_1, \ldots, b_{T_2-1}$}, and an element in the set B is a vector with a length of N/4. Optionally, an element $b_i$ in the set B is a two-dimensional DFT vector, and is in a form shown in (2). In an embodiment, $N'_1 = \frac{1}{2} N_1$, $N'_2 = N_2$, and $$\frac{N}{2} = N_1 N_2.$$

In other words, $T_2 = \frac{1}{2} N_1 O_1 N_2 O_2$. In an embodiment, $T_1 = N_1 O_1 N_2 O_2$. Therefore, a subscript of $b_i$ may satisfy a relationship: $i = N_2 O_2 l_i + m_i$, or $i = \frac{1}{2} N_1 O_1 m_i + l_i$, where $l_i$ and $m_i$ are subscripts of two one-dimensional DFT vectors forming $b_i$, $m_i$ is a non-negative integer less than or equal to $N_2 O_2-1$, and $l_i$ is a non-negative integer less than or equal to $\frac{1}{2} N_1 O_1-1$. In an embodiment, $N_1$ and $N_2$ are positive integers, and may separately represent quantities of antenna ports on a base station side in different dimensions. For example, $N_1$ is a quantity of antenna ports of the base station in a horizontal dimension, and $N_2$ is a quantity of antenna ports of the base station in a vertical dimension. $O_1$ and $O_2$ are positive integers, and may separately represent DFT vector oversampling factors in different dimensions. For example, $\theta_1$ is a DFT vector oversampling factor in the horizontal dimension, and $O_2$ is a DFT vector oversampling factor of the base station in the vertical dimension. Optionally, $N_1$ and $N_2$ are parameters configured by the base station for the user equipment, or $N_1$ and $N_2$ are predefined parameters. Optionally, $O_1$ and $O_2$ are parameters configured by the base station for the user equipment, or $O_1$ and $O_2$ are predefined parameters. $\theta_{p_l}$ is an element in the set $\Phi=\{\theta_0, \theta_2, \ldots, \theta_{S-1}\}$. Optionally, S is a predefined positive integer, or is a positive integer configured by the base station for the user equipment. Optionally, $$\theta_i = e^{j\frac{\pi i}{S}} \cdot \varphi_l$$

is a complex number of a unit amplitude, and is also selected from a predefined set. In the foregoing structure of W, selection of $b_{k_l}$ and $\theta_{p_l}$ is indicated by the PMI 1, and selection of $\varphi_l$ is indicated by the PMI 2. To be specific, $b_{k_l}$ and $\theta_{p_l}$ are wideband parameters, and $\varphi_l$ is a subband parameter. In an embodiment, Set 2 is {3, 4}.

In another embodiment, when the value of R belongs to Set 1, column l of W satisfies $$W_l = \begin{bmatrix} b'_{k_l} \\ \varphi_l b'_{k_l} \end{bmatrix} \in C^{N \times 1} \quad (4)$$

A quantity of rows of W is N, and a quantity of columns of W is a specific value of R. $b'_{k_l}$ is an element in another predefined vector set $B=\{b'_0, b'_1, \ldots, b'_{T_3}\}$, and elements in $B_1$ are all DFT vectors with a length of N/2. Optionally, the elements in $B_1$ are all two-dimensional DFT vectors, and are in a form shown in (2). In an embodiment, $N'_1=N_1$, $N'_2=N_2$, and $$\frac{N}{2} = N_1 N_2.$$

In this case, a quantity of elements in $B_1$ is $T_3=N_1O_1N_2O_2$. Therefore, a subscript of $b'_i$ may satisfy a relationship: $i=N_2O_2 l_i+m_i$, or $i=\frac{1}{2}N_1O_1 m_i+l_i$, where $l_i$ and $m_i$ are subscripts of two one-dimensional DFT vectors forming $b'_i$, $m_i$ is a non-negative integer less than or equal to $N_2O_2-1$, and $l_i$ is a non-negative integer less than or equal to $N_1O_1-1$. Herein, meanings of $N_1$, $N_2$, $O_1$, and $O_2$ are the same as the meanings that are used above for describing the precoding matrix (3): $N_1$ is a quantity of antenna ports of the base station in a horizontal dimension, and $N_2$ is a quantity of antenna ports of the base station in a vertical dimension. $O_1$ and $O_2$ are positive integers, and may separately represent DFT vector oversampling factors in different dimensions. For example, $O_1$ is a DFT vector oversampling factor in the horizontal dimension, and $O_2$ is a DFT vector oversampling factor of the base station in the vertical dimension. Optionally, $N_1$ and $N_2$ are parameters configured by the base station for the user equipment, or $N_1$ and $N_2$ are predefined parameters. Optionally, $O_1$ and $O_2$ are parameters configured by the base station for the user equipment, or $O_1$ and $O_2$ are predefined parameters. In an embodiment, the base station configures same $N_1$, $N_2$, $O_1$, and $O_2$ for all values of R. In other words, regardless of whether R belongs to Set 1 or Set 2, the base station configures same parameters $N_1$, $N_2$, $O_1$, and $O_2$. Selection of $b'_{K_l}$ is indicated by the PMI 1, $\varphi_l$ is a complex number of a unit amplitude, and selection of $\varphi_l$ is indicated by the PMI 2. To be specific, $b'_{K_l}$ is a wideband parameter, and $\varphi_l$ is a subband parameter. Each vector in $B_1$ is a two-dimensional DFT vector. In this embodiment, $T_3=2T_2$. In an embodiment, $T_3=T_1=N_1O_1N_2O_2$.

The following separately describes two implementations, to separately describe indication methods of the first field in different association relationships.

Implementation 1: That at least one bit indicates at least two elements $\{b_{i0}, b_{i1}, \ldots, b_{ik}\}$ in a set B includes:

bit x of the $T_1$ bits indicates at least one element in B; and/or bit y of the $T_1$ bits indicates at least two elements in B, where x satisfies a condition:

$$\left\lfloor \frac{x}{K_2} \right\rfloor$$

is an even number, y satisfies a condition:

$$\left\lfloor \frac{y}{K_2} \right\rfloor$$

is an odd number, x and y are non-negative integers less than or equal to $T_1-1$, and $K_2$ is a positive integer less than $T_1$.

In an embodiment, $T_1=K_1K_2$, and both $K_2$ and $K_1$ are positive integers. In another embodiment, $K_1=N_1O_1$, $K_2=N_2O_2$, and $T_1=N_1O_1N_2O_2$. Meanings of $N_1$, $N_2$, $O_1$, and $O_2$ are the same as the meanings that are used above for describing the precoding matrices (3) and (4). Details are not described again. For example, if $N_1=8$, $N_2=1$, $O_1=4$, and $O_2=1$, $T_1=32$, and $K_2=1$. In this case, bit x=0, 2, 4 ..., 28, 30 indicates at least one element in B, and bit y=1, 3, 5, ..., 29, 31 indicates at least two elements in B. For another example, if $N_1=2$, $N_2=2$, $O_1=2$, and $O_2=2$, $T_1=17$, and $K_2=4$. In this case, bit x=0, 1, 2, 3, 8, 9, 10, 11 indicates at least one element in B, and bit y=4, 5, 6, 7, 12, 13, 14, 15 indicates at least two elements in B.

Optionally, the foregoing embodiment is applicable to only some values of R. For example, when R belongs to Set 2, content indicated by each of the $T_1$ bits is the same as that described in the foregoing embodiment. When R belongs to Set 1, as described above, each bit of $T_1$ indicates an element in another vector set $B_1$. For example, there are $T_1$ elements in $B_1=\{b'_1, b'_2, \ldots, B'_{T_l}\}$, and the bits in the bitmap are in a one-to-one correspondence with the elements in $B_1$.

In another embodiment, an element indicated by bit $K_2*2p+m$ of the $T_1$ bits includes $b_{K_2p+m}$; and/or at least two elements indicated by bit $K_2*(2p+1)+m$ of the $T_1$ bits include $b_{K_2p+m}$ and $b_{K_2(p+1)+m}$, where p is a non-negative integer less than $T_1$, and m is a non-negative integer less than $K_2$. An element in the set B is a two-dimensional DFT vector, and an element $b_{K_2q+n}$ in B satisfies $b_{K_2q+n}=v_q \otimes u_n$, where $v_q$ is a one-dimensional DFT vector with a length of $N_v$, $u_n$ is a one-dimensional DFT vector with a length of $N_u$, $N=4N_vN_u$, $N_v$ and $N_u$ are positive integers, $\otimes$ represents a Kronecker product, q is a non-negative integer less than $T_1$, and n is a non-negative integer less than $K_2$. Optionally, a form of $v_q$ and $u_n$ is shown in Formula (1). $N'_1=N_v$, and $N'_2=N_u$. As analyzed above, the element $b_{K_2q+n}$ may be further equivalently represented as $b_{q,n}$. In this case, an indication relationship of each element in the bitmap is shown in Table 3:

TABLE 3

| Bit | Indicated element in B |
|---|---|
| $a_{K_2(2p)+n}$ | $b_{p,n}$ |
| $a_{K_2(2p+1)+n}$ | $b_{p,n}, b_{p+1,n}$ |

In Table 3, $a_{K_2x+n}$ represents bit $K_2x+n$ in the bitmap, x is a non-negative integer less than or equal to $T_1-1$, n is a non-negative integer less than or equal to $K_2-1$, $b_{p,n}$ is an element in the set B and is a two-dimensional DFT vector, and $b_{p,n}$ is $b_{K_2p+n}$.

In an embodiment, $N_v = \frac{1}{2}N_1$, $N_u = N_2$, $K_2 = N_2O_2$, and $T_2 = \frac{1}{2}N_1O_1N_2O_2$. Herein, meanings of $N_1$, $N_2$, $O_1$, and $O_2$ are the same as the meanings that are used above for describing the precoding matrices (3) and (4). Details are not described again. Optionally, $T_1 = N_1O_1N_2O_2$. In this case, an indication relationship of each element in the bitmap is shown in Table 4:

TABLE 4

| Bit | Indicated element in B |
|---|---|
| $a_{N_2O_2(2p)+n}$ | $b_{p,n}$ |
| $a_{N_2O_2(2p+1)+n}$ | $b_{p,n}, b_{p+1,n}$ |

In Table 4, $a_{N_2O_2x+n}$ represents bit $N_2O_2x+n$ in the bitmap, x is a non-negative integer less than or equal to $N_1O_1-1$, n is a non-negative integer less than or equal to $N_2O_2-1$, and $b_{p,n}$ is an element in the set B and is a two-dimensional DFT vector. With a parameter value in this embodiment, $b_{p,n}$ is $b_{N_2O_2+p+n}$. Table 4 may be further written as the following equivalent form:

TABLE 5

| Bit | Indicated element in B |
|---|---|
| $a_{N_2O_2(p)+n}$ (p is an even number) | $b_{\lfloor \frac{p}{2} \rfloor, n}$ |
| $a_{N_2O_2(p)+n}$ (p is an odd number) | $b_{\lfloor \frac{p}{2} \rfloor, n}, b_{\lfloor \frac{p}{2} \rfloor + 1, n}$ |

Therefore, when a bit is 0, a precoding matrix formed by any one or more of elements indicated by the bit is restricted. A manner of forming a precoding matrix by an element in B is related to a rank R. After a value of R is determined, the manner of forming a precoding matrix by an element in B is determined. The forming a precoding matrix by an element in B herein still indicates that the element forms at least one column of the precoding matrix W. Optionally, when a value of a bit is 1, an associated precoding matrix is restricted.

Optionally, the foregoing embodiment is applicable to only some values of R. For example, when R belongs to Set 2, content indicated by each bit of $T_1$ is the same as that described in the foregoing embodiment. When R belongs to Set 1, as described above, each bit of $T_1$ indicates an element in another vector set B. For example, there are $T_1$ elements in $B_1 = \{b'_1, b'_2, \ldots, b'_{T_1}\}$ and the bits in the bitmap are in a one-to-one correspondence with the elements in $B_1$. For example, as shown in Table 6, element $K_2p+n$ indicates element $K_2p+n$, namely, $b'_{K_2p+n}$, in $B_1$:

TABLE 6

| Bit | Indicated element in B |
|---|---|
| $a_{K_2(p)+n}$ | $b'_{p,n}$ |

$b'_{p,n} = v'_p \otimes u'_n$ is an element in the set $B_1$ and is a two-dimensional DFT vector, $v'_p$ and $u'_n$ are respectively a one-dimensional DFT vector with a length of $N'_v$ and a one-dimensional DFT vector with a length of $N'_u$, $N = 2N'_v N'_u$, $N'_v$ and $N'_u$ are positive integers, and $\otimes$ represents a Kronecker product. Optionally, a form of $v'_p$ and $u'_n$ is shown in Formula (1). $N'_1 = N'_v$, and $N'_2 = N'_u$. With a parameter value in this embodiment, $b'_{p,n}$ is $b_{K_2p+n}$. In an embodiment, $N'_v = N_1$, $N'_u = N_2$, $K_2 = N_2O_2$, and $T_1 = N_1O_1N_2O_2$. Herein, meanings of $N_1$, $N_2$, $O_1$, and $O_2$ herein are the same as the meanings that are used above for describing the precoding matrices (3) and (4). Details are not described again. In this case, an indication relationship of each element in the bitmap is shown in Table 7:

TABLE 7

| Bit | Indicated element in B |
|---|---|
| $a_{N_2O_2(p)+n}$ | $b'_{p,n}$ |

Therefore, when a bit is 0, a precoding matrix with a rank of R that is formed by any one or more of elements indicated by the bit is restricted. A manner of forming a precoding matrix by an element in $B_1$ is related to a rank R After R is determined, the manner of forming a precoding matrix by an element in $B_1$ is determined. The forming a precoding matrix by an element in $B_1$ herein still indicates that the element forms at least one column of the precoding matrix W. Optionally, when a value of a bit is 1, an associated precoding matrix is restricted.

It should be understood that, in the foregoing plurality of embodiments, bit n included in the first field is a bit corresponding to a number n, to be specific, the $T_1$ bits are bit 0 to bit $T_1-1$. For another parameter in this implementation, the zeroth parameter may be a parameter corresponding to a number 0. In another embodiment, alternatively, x may satisfy a condition:

$$\left\lfloor \frac{x}{K_2} \right\rfloor$$

is an odd number, and y may satisfy a condition:

$$\left\lfloor \frac{y}{K_2} \right\rfloor$$

is an even number.

In the present invention, $\lfloor a \rfloor$ represents rounding down a real number a.

Implementation 2: That at least one bit indicates at least two elements $\{b_{i0}, b_{i1}, \ldots, b_{ik}\}$ in a set B includes:

bit x of the $T_1$ bits indicates at least three elements in B; and/or bit y of the $T_1$ bits indicates at least four elements in B, where x satisfies a condition:

$$\left\lfloor \frac{x}{K_2} \right\rfloor$$

is an even number, v satisfies a condition:

$$\left\lfloor \frac{y}{K_2} \right\rfloor$$

is an odd number, x and y are non-negative integers less than or equal to $T_1-1$, and $K_2$ is a positive integer less than $T_1$.

In an embodiment, $T_1=K_1K_2$, and both $K_2$ and $K_1$ are positive integers. In another embodiment, $K_1=N_1O_1$, $K_2=N_2O_2$, and $T_1=N_1O_1N_2O_2$. Meanings of $N_1$, $N_2$, $O_1$, and $O_2$ are the same as the meanings that are used above for describing the precoding matrices (3) and (4). Details are not described again. For example, if $N_1=8$, $N_2=1$, $O_1=4$, and $O_2=1$, $T_1=32$, and $K_2=1$. In this case, bit x=0, 2, 4 . . . , 28, 30 indicates at least two elements in B, and bit y=1, 3, 5, . . . , 29, 31 indicates at least four elements in B. For another example, if $N_1=2$, $N_2=2$, $O_1=2$, and $O_2=2$, $T_1=17$, and $K_2=4$. In this case, bit x=0, 1, 2, 3, 8, 9, 10, 11 indicates at least two elements in B. and bit v=4, 5, 6, 7, 12, 13, 14, 15 indicates at least four elements in B.

Optionally, the foregoing embodiment is applicable to only some values of R For example, when R belongs to Set 2, content indicated by each bit of $T_1$ is the same as that described in the foregoing embodiment. When R belongs to Set 1, as described above, each bit of $T_1$ indicates an element in another vector set $B_1$. For example, there are $T_1$ elements in $B_1=\{b'^1, b'_2, \ldots, b'_{T_1}\}$, and the bits in the bitmap are in a one-to-one correspondence with the elements in $B_1$.

In another embodiment, elements indicated by bit $K_2*2p+m$ of the $T_1$ bits include $b_{K_2p+m}$, $b_{K_2 \times f(p-1)+m}$, and $b_{K_2 \times f(p+1)+m}$; and/or elements indicated by bit $K_2*(2p+1)+m$ of the $T_1$ bits include $b_{K_2p+m}$, $b_{K_2 \times f(p-1)+m}$, $b_{K_2 \times f(p+1)+m}$, and $b_{K_2 \times f(p+2)+m}$, where p is a non-negative integer less than $T_1$, m is a non-negative integer less than $K_2$, a function $$f(z) = z \bmod\left(\frac{1}{2}K_1\right),$$

$K_1$ is an integer, and A mod B represents a remainder of division of an integer A by an integer B.

An element in the set B is a two-dimensional DFT vector, and an element $b_{K_2q+n}$ in B satisfies $b_{K_2q+n}=v_q \otimes u_n$, where $v_q$ is a one-dimensional DFT vector with a length of $N_v$, $u_n$ is a one-dimensional DFT vector with a length of $N_u$, $N=4N_vN_u$, $N_v$ and $N_u$ are positive integers, $\otimes$ represents a Kronecker product, q is a non-negative integer less than $T_1$, and n is a non-negative integer less than $K_2$. Optionally, a form of $v_q$ and $u_n$ is shown in Formula (1). $N'_1=N'_v$, and $N'_2=N_u$. As analyzed above, the element $b_{K_2q+n}$ may be further equivalently represented as $b_{q,n}$. In an embodiment, $N_v=\frac{1}{2}N_1$, $N_u=N_2$, $K_1=N_1O_1$, $K_2=N_2O_2$, and $T_2=\frac{1}{2}N_1O_1N_2O_2$. Herein, meanings of $N_1$, $N_2$, $O_1$, and $O_2$ are the same as the meanings that are used above for describing the precoding matrices (3) and (4). Details are not described again. Optionally, $T_1=N_1O_1N_2O_2$. In this case, an indication relationship of each element in the bitmap is shown in Table 8:

TABLE 8

| Bit | Indicated element in B |
|---|---|
| $a_{N_2O_2(2p)+n}$ | $b_{p,n}$, $b_{f(p-1),n}$, $b_{f(p+1),n}$ |
| $a_{N_2O_2(2p+1)+n}$ | $b_{p,n}$, $b_{f(p-1),n}$, $b_{f(p+1),n}$, $b_{f(p+2),n}$ |

In Table 8, $a_{N_2O_2x+n}$ represents bit $N_2O_2x+n$ in the bitmap, x is a non-negative integer less than or equal to $N_1O_1-1$, n is a non-negative integer less than or equal to $N_2O_2-1$, and $b_{p,n}$ is an element in the set B and is a two-dimensional DFT vector. With a parameter value in this embodiment, $b_{p,n}$ is $b_{N_2O_2p+n}$. Table 8 may be further written as the following equivalent form:

TABLE 9

| Bit | Indicated element in B |
|---|---|
| $a_{N_2O_2(p)+n}$ (p is an even number) | $b_{\lfloor \frac{p}{2}\rfloor,n}$, $b_{f(\lfloor \frac{p}{2}\rfloor-1),n}$, $b_{f(\lfloor \frac{p}{2}\rfloor+1),n}$ |
| $a_{N_2O_2(p)+n}$ (p is an odd number) | $b_{\lfloor \frac{p}{2}\rfloor,n}$, $b_{f(\lfloor \frac{p}{2}\rfloor-1),n}$, $b_{f(\lfloor \frac{p}{2}\rfloor+1),n}$, $b_{f(\lfloor \frac{p}{2}\rfloor+2),n}$ |

Therefore, when a bit is 0, a precoding matrix formed by any one or more of elements indicated by the bit is restricted. A manner of forming a precoding matrix by an element in B is related to a rank R. After R is determined, the manner of forming a precoding matrix by an element in B is determined. The forming a precoding matrix by an element in B herein still indicates that the element forms at least one column of the precoding matrix W. Optionally, when a value of a bit is 1, an associated precoding matrix is restricted.

Optionally, the foregoing embodiment is applicable to only some values of R. For example, when R belongs to Set 2, content indicated by each bit of $T_1$ is the same as that described in the foregoing embodiment. When R belongs to Set 1, as described above, each bit of $T_1$ indicates an element in another vector set $B_1$. For example, there are $T_1$ elements in $B_1=\{b'_1, b'_2, \ldots, b'_{T_1}\}$, and the bits in the bitmap are in a one-to-one correspondence with the elements in $B_1$. A specific manner may be shown in Table 6, and details are not described again.

It should be understood that, in the embodiments, bit n included in the first field is a bit corresponding to a number n, to be specific, the $T_1$ bits are bit 0 to bit $T_1-1$. In an embodiment, the $T_1$ bits may be alternatively numbered from a number 1.

In another embodiment, alternatively, x may satisfy a condition:

$$\left\lfloor \frac{x}{K_2} \right\rfloor$$

is an odd number, and y may satisfy a condition:

$$\left\lfloor \frac{y}{K_2} \right\rfloor$$

is an even number.

As another embodiment of the present invention, an element indicated by bit $K_2*r+m$ of the $T_1$ bits includes $\theta_{r \bmod s}$, where r is a non-negative integer less than $T_1$, m is a non-negative integer less than $K_2$, and A mod B represents a remainder of division of an integer A by an integer B.

This embodiment may be combined with the foregoing embodiment. As described in the foregoing embodiment, an element indicated by bit $K_2*2p+m$ of the $T_1$ bits includes $b_{K_2p+m}$. In this embodiment, the bit further indicates a phase $\theta_{2p \bmod s}$. Therefore, a precoding matrix formed by both the elements $b_{K_2p+m}$ and $\theta_{2p \bmod s}$ is a precoding matrix associated with the bit. Forming a precoding matrix by both the elements $b_{K_2p+m}$ and $\theta_{2p\ mod\ s}$ indicates that $b_{K_2p+m}$ and $\theta_{2p\ mod\ s}$ jointly form at least one column of the precoding matrix. In addition, because both $b_{K_2p+m}$ and $\theta_{2p\ mod\ s}$ are wideband parameters, when the user equipment reports a PMI, both $b_{K_2p+m}$ and $\theta_{2p\ mod\ s}$ are indicated by a PMI 1. A specific manner of forming the precoding matrix is shown in Formula (3).

In an embodiment, with reference to Table 5, $K_2=N_2O_2$, $T_2=\frac{1}{2}N_1O_1N_2O_2$, and $T_1=N_1O_1N_2O_2$. In this case, an indication relationship of each element in the bitmap is shown in Table 10:

TABLE 10

| Bit | Indicated element in B |
|---|---|
| $a_{N_2O_2(2p)+n}$ | $b_{p,n}, \theta_{2p\ mod\ S}$ |
| $a_{N_2O_2(2p+1)+n}$ | $b_{p,n}, b_{p+1,n}, \theta_{2p\ mod\ S}$ |

Therefore, a precoding matrix associated with bit $a_{N_2O_2(2p)+n}$ is a precoding matrix formed by $b_{p,n}$ and $\theta_{2p\ mod\ s}$ based on Formula (3); a precoding matrix associated with bit $a_{N_2O_2(2p+1)+n}$ is a precoding matrix formed by both $b_{p,n}$ and $\theta_{2p\ mod\ s}$ based on Formula (3), a precoding matrix formed by both $b_{p+1,n}$ and $\theta_{2p\ mod\ s}$ based on Formula (3), or a precoding matrix formed by both $b_{p-1,n}$ and $\theta_{2p\ mod\ s}$ based on Formula (3); a precoding matrix associated with bit $a_{N_2O_2(2p+1)+n}$ is a precoding matrix formed by both $b_{p,n}$ and $\theta_{2p\ mod\ s}$ based on Formula (3); and a precoding matrix associated with bit $a_{N_2O_2(2p+1)+n}$ is a precoding matrix formed by both $b_{p,n}$ and $\theta_{2p\ mod\ s}$ based on Formula (3), a precoding matrix formed by both $b_{p+1,n}$ and $\theta_{2p\ mod\ s}$ based on Formula (3), a precoding matrix formed by both $b_{p-1,n}$ and $\theta_{2p\ mod\ s}$ based on Formula (3), or a precoding matrix formed by both $b_{p+2,n}$ and $\theta_{2p\ mod\ s}$ based on Formula (3). Optionally, when a bit is 0, a precoding matrix associated with the bit is restricted. Optionally, when a value of a bit is 1, a precoding matrix associated with the bit is restricted.

Another embodiment may be described with reference to Table 4, Table 5, or Table 8. A specific manner is similar to the foregoing manner, and details are not described again.

In an embodiment, an element in the set $\Phi\{\theta_0, \theta_1, \ldots, \theta_{S-1}\}$ is $$\theta_q = e^{j\frac{\pi q}{S}},$$

where q=0, 1, ..., S-1. In another embodiment, an element in the set $\Phi=\{\theta_0, \theta_1, \ldots, \theta_{S-1}\}$ is $$\theta_q = -e^{j\frac{\pi q}{S}},$$

where q=0, 1, ..., S-1.

As an embodiment not shown in the figure, step S201 may alternatively be replaced with step S201':

A base station determines a first field, where the first field includes $T_1$ bits, at least one of the $T_1$ bits is associated with at least two preceding matrices, and each of the at least two preceding matrices is formed by an element in B and an element in $\Phi$, and correspondingly, precoding matrices associated with all bits of $T_1$ whose values are 0 are formed by a subset $B_0$ of B and a subset $\Phi''$ of $\Phi$, and an element forming a preceding matrix W does not include an element in $\{B_0\}$ or an element in $\Phi''$. Column 1 of W satisfies $$W(l) = \begin{bmatrix} b_{k_l} \\ (-1)^l \theta_{p_l} b_{k_l} \\ \varphi_l b_{k_l} \\ (-1)^l \varphi_l \theta_{p_l} b_{k_l} \end{bmatrix},$$

a quantity of rows of W is N, a quantity of columns of W is R, N is greater than or equal to R, $b_{k_l}$ is an element in the set $B=\{b_0, b_1, \ldots, b_{T_2-1}\}$, an element in the set B is a vector with a length of N/4, $\theta_{p_l}$ is an element in the set $\Phi=\{\theta_0, \theta_1, \ldots, \theta_{S-1}\}$, an element in $\Phi$ is a complex number of a unit amplitude, $\varphi_l$ is a complex number of a unit amplitude, $T_1$, $T_2$, and S are all positive integers, $T_1 < S*T_2$, and l is an integer greater than or equal to 0 and less than or equal to R−1.

As an embodiment, that precoding matrices associated with all bits whose values are 0 are formed by a subset $\{B_0\}$ of B and a subset $\Phi''$ of $\Phi$ may alternatively be: precoding matrices associated with all bits whose values are 1 are formed by a subset $\{B_0\}$ of B and a subset $\Phi''$ of $\Phi$. As another embodiment, $T_1=2T_2$.

Step S202: The base station sends the first field. The base station may send the first field to the user equipment. In a corresponding embodiment, the user equipment receives the first field sent by the base station. The first field may be a first field shown in step S201.

In an embodiment, the field may be sent by using higher layer signaling.

According to the foregoing embodiments, based on a relationship between DFT vectors with different lengths, for some values of the rank R, at least one bit of the first field indicates at least two elements in the vector set B, and indicates at least one element in the phase set; and for other values of the rank R, each bit indicates an element in another vector set B'. In this way, the first field corresponds to a plurality of vector elements when some ranks are relatively special, so that the first field can be shared in a system for different values of the rank. In other words, a same first field is applied to all values of the rank. This can avoid designing different first fields for different values of the rank, and help effectively reduce a length of the first field, thereby saving air interface resources.

Figure 3:
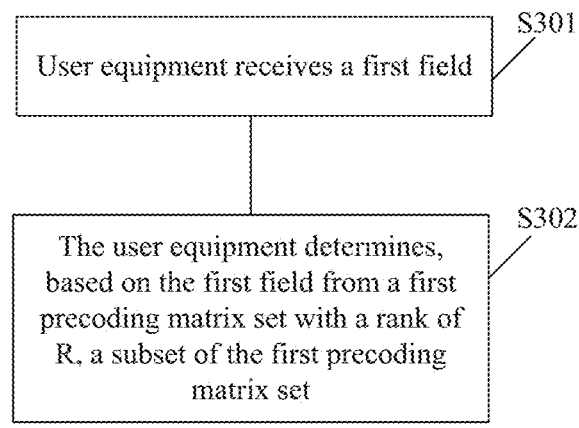
FIG. 3 is a schematic flowchart of a signaling receiving method according to an embodiment of the present invention.

FIG. 3 shows another embodiment of the present invention.

Step S301: User equipment receives a first field, where the first field includes $T_1$ bits, at least one of the $T_1$ bits indicates at least two elements $\{b_{i0}, b_{i1}, \ldots, b_{ik}\}$ in a set B, the at least one bit further indicates at least one element $\{\theta_{j0}, \theta_{j1}, \ldots, \theta_{jh}\}$ in a set $\Phi$, and at least one element in $\{b_{i0}, b_{i1}, \ldots, b_{ik}\}$ and at least one element in $\{\theta_{j0}, \theta_{j1}, \ldots, \theta_{jh}\}$ are used to form a precoding matrix. It should be understood that, the method in step S301 and step 202 shown in FIG. 2 may be a same sending and receiving step, in which after the base station sends the first field, the user equipment receives the first field.

As an optional embodiment, the precoding matrix is a precoding matrix associated with the at least one bit.

The set $B=\{b_0, b_1, \ldots, b_{T_2-1}\}$, an element in the set B is a vector with a length of N/4, the set $\Phi=\{\theta_0, \theta_1, \ldots, \theta_{S-1}\}$, an element in $\Phi$ is a complex number of a unit amplitude, column 1 of the precoding matrix W satisfies $$W(l) = \begin{bmatrix} b_{k_l} \\ (-1)^l \theta_{p_l} b_{k_l} \\ \varphi_l b_{k_l} \\ (-1)^l \varphi_l \theta_{p_l} b_{k_l} \end{bmatrix},$$

a quantity of rows of W is N, a quantity of columns of W is R, N is greater than or equal to R, $b_{k_l}$ is an element in $\{b_{i0}, b_{i1}, \ldots, b_{ik}\}$, $\theta_{p_l}$ is an element in $\{\theta_{j0}, \theta_{j1}, \ldots, \theta_{jh}\}$, $\varphi_l$ is a complex number of a unit amplitude, $T_1$, $T_2$, and S are all positive integers, $T_1 < S*T_2$, and l is an integer greater than or equal to 0 and less than or equal to R−1.

In an embodiment, step 302 is further included: The user equipment determines, based on the first field from a first precoding matrix set with a rank of R, a subset of the first precoding matrix set. In another embodiment, the user equipment receives a reference signal, and determines a value of R based on the reference signal. In an implementation, the value of R is a value of a rank indication.

The subset of the first precoding matrix set does not include a precoding matrix associated with a bit whose value is 0 in the T1 bits; or the subset of the first precoding matrix set does not include a precoding matrix associated with a bit whose value is 1 in the T1 bits.

Indication manners of the first field and meanings of the indications are similar to those in the embodiment shown in FIG. 2, and details are not described herein again. After receiving the first field, the user equipment may parse a precoding matrix codebook subset based on the value of R and the first field, and determine the precoding matrix based on the reference signal. The first field corresponds to a plurality of vector elements, so that signaling overheads can be reduced.

Figure 4:
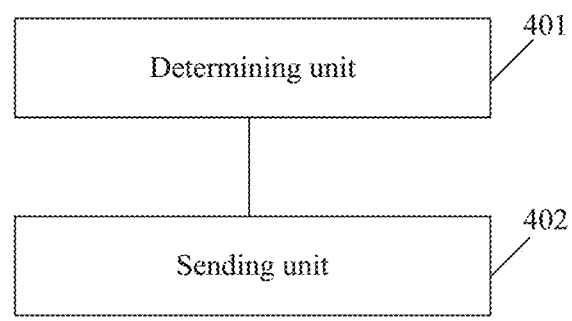
FIG. 4 is a structural diagram of a signaling sending apparatus according to an embodiment of the present invention.

FIG. 4 shows another embodiment of the present invention, and specifically shows a base station. The base station includes a determining unit 401, configured to determine a first field, where the first field includes $T_1$ bits, at least one of the $T_1$ bits indicates at least two elements $\{b_{i0}, b_{i1}, \ldots, b_{ik}\}$ in a set B, the at least one bit further indicates at least one element $\{\theta_{j0}, \theta_{j1}, \ldots, \theta_{jh}\}$ in a set Φ, and at least one element in $\{b_{i0}, b_{i1}, \ldots, b_{ik}\}$ and at least one element in $\{\theta_{j0}, \theta_{j1}, \ldots, \theta_{jh}\}$ are used to form a precoding matrix. As an optional embodiment, the precoding matrix is a precoding matrix associated with the at least one bit.

The set $B = \{b_0, b_1, \ldots, b_{T_2-1}\}$, an element in the set B is a vector with a length of N/4, the set $\Phi = \{\theta_0, \theta_1, \ldots, \theta_{S-1}\}$, an element in Φ is a complex number of a unit amplitude, column l of the precoding matrix W satisfies $$W(l) = \begin{bmatrix} b_{k_l} \\ (-1)^l \theta_{p_l} b_{k_l} \\ \varphi_l b_{k_l} \\ (-1)^l \varphi_l \theta_{p_l} b_{k_l} \end{bmatrix},$$

a quantity of rows of W is N, a quantity of columns of W is R, N is greater than or equal to R, $b_{k_l}$ is an element in $\{b_{i0}, b_{i1}, \ldots, b_{ik}\}$, $\theta_{p_l}$ is an element in $\{\theta_{j0}, \theta_{j1}, \ldots, \theta_{jh}\}$, $\varphi_l$ is a complex number of a unit amplitude, $T_1$, $T_2$, and S are all positive integers, $T_1 < S*T_2$, and l is an integer greater than or equal to 0 and less than or equal to R−1.

The base station further includes a sending unit 402, configured to send the first field.

In the base station, the determining unit of the base station may perform various steps in step S201, and the sending unit may perform various steps in step S202. Details are not described herein again.

Figure 5:
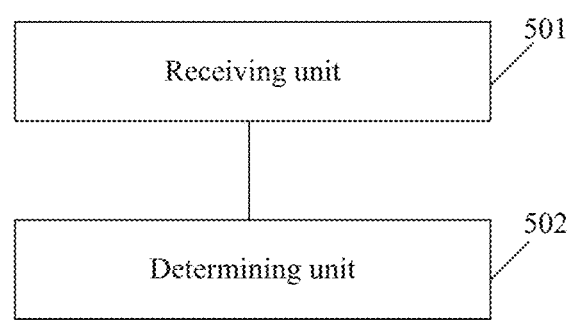
FIG. 5 is a structural diagram of a signaling sending apparatus according to an embodiment of the present invention.

FIG. 5 shows another embodiment of the present invention, and specifically shows user equipment. The user equipment includes a receiving unit 501, configured to receive a first field, where the first field includes $T_1$ bits, at least one of the $T_1$ bits indicates at least two elements $\{b_{i0}, b_{i1}, \ldots, b_{ik}\}$ in a set B, the at least one bit further indicates at least one element $\{\theta_{j0}, \theta_{j1}, \ldots, \theta_{jh}\}$ in a set Φ, and at least one element in $\{b_{i0}, b_{i1}, \ldots, b_{ik}\}$ and at least one element in $\{\theta_{j0}, \theta_{j1}, \ldots, \theta_{jh}\}$ are used to form a precoding matrix.

The set $B = \{b_0, b_1, \ldots, b_{T_2-1}\}$, an element in the set Φ is a vector with a length of N/4, the set $\Phi = \{\theta_0, \theta_1, \ldots, \theta_{S-1}\}$, an element in Φ is a complex number of a unit amplitude, column l of the precoding matrix W satisfies $$W(l) = \begin{bmatrix} b_{k_l} \\ (-1)^l \theta_{p_l} b_{k_l} \\ \varphi_l b_{k_l} \\ (-1)^l \varphi_l \theta_{p_l} b_{k_i} \end{bmatrix},$$

a quantity of rows of W is N, a quantity of columns of W is R, N is greater than or equal to R, $b_{k_l}$ is an element in $\{b_{i0}, b_{i1}, \ldots, b_{ik}\}$, is an element in $\{\theta_{j0}, \theta_{j1}, \ldots, \theta_{jh}\}$, $\varphi_l$ is a complex number of a unit amplitude, $T_1$, $T_2$, and S are all positive integers, $T_1 < S*T_2$, and l is an integer greater than or equal to 0 and less than or equal to R−1.

As an embodiment, the user equipment further includes a determining unit 502, configured to determine, based on the first field from a first precoding matrix set with a rank of R, a subset of the first precoding matrix set, where the subset of the first precoding matrix set does not include a precoding matrix associated with a bit whose value is 0 in the T1 bits; or the subset of the first precoding matrix set does not include a precoding matrix associated with a bit whose value is 1 in the T1 bits. The determining unit may further perform a necessary intermediate step such as parsing or data calculation. In the user equipment, the receiving unit 501 may perform various steps in step S301, and the determining unit 502 may perform various steps in step S302. Details are not described herein again.

Figure 6:
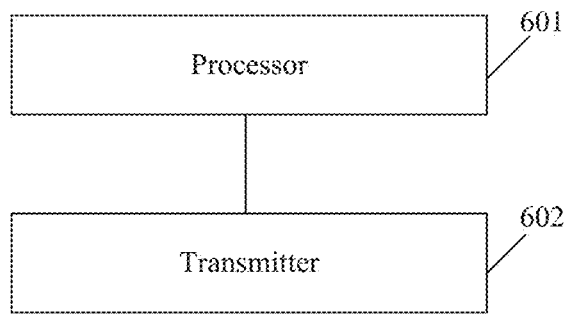
FIG. 6 is a structural diagram of a signaling sending apparatus according to an embodiment of the present invention.

FIG. 6 shows another embodiment of the present invention, and specifically shows a base station. The base station includes a processor 601, configured to perform various steps in step S201 in the embodiment in FIG. 2. The processor 601 may also implement functions of the determining unit 401 in FIG. 4. In an embodiment, the base station further includes a transmitter 602, configured to perform steps in step S202 in the embodiment in FIG. 2. The transmitter may be an antenna. The base station further includes a memory, configured to store intermediate values in calculation steps or data generated in a calculation process, or a computer program for performing step S201.

Figure 7:
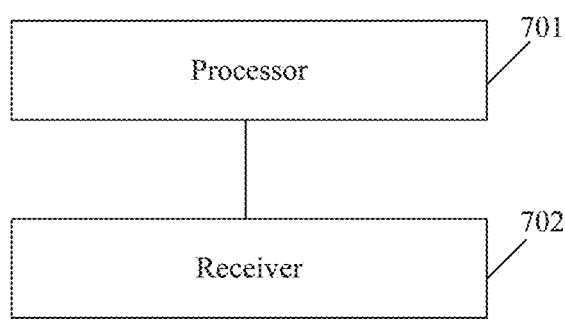
FIG. 7 is a structural diagram of a signaling sending apparatus according to an embodiment of the present invention.

FIG. 7 shows another embodiment of the present invention, and specifically shows user equipment. The user equipment includes a processor 701, configured to perform the manner in step S302 in the embodiment in FIG. 3. As an independent embodiment, the user equipment may include a receiver 702, configured to perform the manner in step S301 shown in FIG. 3. The receiver may be an antenna. The user equipment further includes a memory, configured to store intermediate values in calculation steps or data generated in a calculation process, or a computer program for performing step S302. In an embodiment, the processor also helps implement step S301, for example, controls implementation of step S301.

Figure 8:
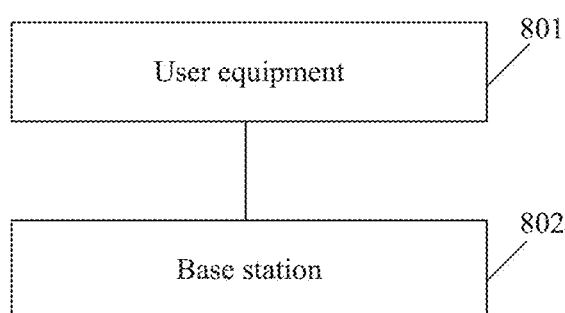
FIG. 8 is a structural diagram of a system architecture according to an embodiment of the present invention.

FIG. 8 shows another embodiment of the present invention, and specifically shows a system. The system includes user equipment 801 and a base station 802. The base station may be the base station shown in FIG. 4, and the user equipment may be the user equipment shown in FIG. 5. The user equipment is connected to the base station through a wireless interface. In another embodiment, the base station may be the base station shown in FIG. 6, and the user equipment may be the user equipment shown in FIG. 7. In a scenario, the base station 802 may alternatively be a relay, for example, user equipment, and include a determining unit 401 and a sending unit 402.

Figure 9:
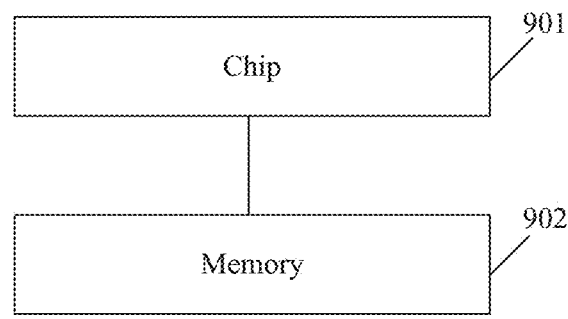
FIG. 9 is a structural diagram of a chip system architecture according to an embodiment of the present invention.

FIG. 9 shows an embodiment of the present invention, and shows an integrated circuit system. The integrated circuit system includes a chip 901 and a memory 902. The chip and the memory are welded on a circuit board, and the circuit board is located on a network side or a user equipment side. The memory 902 is connected to the chip 901 by using integrated circuit cabling, or may be integrated inside the chip 901. The chip reads or stores calculated data and an instruction by being connected to the memory. The chip is connected to a contact point of an integrated circuit in a contact manner, and is connected to another chip, a connector, or an antenna by using cabling, to send/receive data and an instruction. A specific connection manner may be using various high-speed or low-speed interfaces. The chip may be a chip having an X86 instruction set, an advanced reduced instruction set computer machine (advanced RISC machine, ARM) instruction set, or another instruction set, or may be a logical chip, such as a field programmable gate array (field programmable gate array, FPGA). The memory may be an internal memory, a hard disk, an erasable FLASH chip, or the like. The integrated circuit system may implement functions of receiving data, sending data, and processing data. For example, when the integrated circuit system is in a base station, the integrated circuit system may implement the steps shown in FIG. 2. Specific calculation may be performed by the integrated circuit system by invoking an instruction and data from the memory. The base station may perform necessary operations of addition, subtraction, multiplication, or division and other logical operations by using a gate circuit, to determine a first field based on the frequency-domain resource information, and then send, through an interface, the first field to other components that need to process the first field; and finally send the first field to a terminal device. When the integrated circuit system is on a terminal side, the integrated circuit system can implement the steps shown in FIG. 3.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, all or some of the procedures or functions according to the embodiments of the present invention are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

What is claimed is:

1. A field notification method, wherein the method comprises:

receiving, by a user equipment, a first field, wherein the first field comprises $T_1$ bits, the first field indicates one or more vectors that are allowed to be used to construct a precoding matrix W in a vector set, the precoding matrix W comprises N rows and R columns, N is greater than R;

determining, by the user equipment and based on the first field, the one or more vectors that are allowed to be used to construct the precoding matrix W in the vector set; wherein R is equal to 3 or 4, an $l^{th}$ column of the precoding matrix W satisfies:

$$W(l) = \begin{bmatrix} b_{k_l} \\ (-1)^l \theta_{p_l} b_{k_l} \\ \varphi_l b_{k_l} \\ (-1)^l \varphi_l \theta_{p_l} b_{k_l} \end{bmatrix},$$

$b_{k_l}$ satisfies $b_{k_l} = v_{l_i} \otimes u_{m_i}$, $v_{l_i}$ satisfies $v_{l_i} = \begin{bmatrix} 1 & e^{j4\pi \frac{l_i}{N_1 O_1}} & \ldots & e^{j4\pi \frac{(N_1/2-1)l_i}{N_1 O_1}} \end{bmatrix}^T$, $u_{m_i}$ satisfies $u_{m_i} = \begin{bmatrix} 1 & e^{j2\pi \frac{m_i}{N_2 O_2}} & \ldots & e^{j2\pi \frac{(N_2-1)m_i}{N_2 O_2}} \end{bmatrix}^T$, and l is a non-negative integer smaller than R−1, i is an integer, $m_i$ is a non-negative integer smaller than $N_2 O_2 - 1$, $l_i$ is a non-negative integer smaller than $\frac{1}{2} N_1 O_1 - 1$, $N_1$ and $N_2$ are positive integers and separately represent numbers of antenna ports in different dimensions, $O_1$ and $O_2$ are positive integers separately representing Discrete Fourier Transform (DFT) vector oversampling factors in different dimensions, $\theta_{p_l}$ is an element of set $\Phi = \{\theta_0, \theta_1, \ldots, \theta_{S-1}\}$, S is a predefined positive integer, $\varphi_l$ is a complex number of a unit amplitude, $T_1 = N_1 O_1 N_2 O_2$, the vector set is vector set B, $B = \{b_0, b_1, \ldots, b_{T_2-1}\}$, $T_2 = \frac{1}{2} N_1 O_1 N_2 O_2$, a length of each vector in the vector set B is N/4, bit x of the $T_1$ bits corresponds to a vector of vector set B, bit x indicates whether the corresponding vector is allowed to be used to construct the precoding matrix W, bit y of the $T_1$ bits is corresponding to two vectors of vector set B, used to indicate whether the corresponding two vectors can construct the precoding matrix W, x satisfies a condition:

$\lfloor \frac{x}{K_2} \rfloor$ is an even number, y satisfies a condition:

$\lfloor \frac{y}{K_2} \rfloor$ is an odd number, x and y are non-negative integers smaller or equal to $T_1-1$, $K_2=N_2O_2$, $b_{k_1}$ is selected from the one or more vectors that are indicated by the first field.

2. The method according to claim 1, wherein the $K_2 \times 2p+m^{th}$ bit of the $T_1$ bits indicates whether the vector $b_{K_2p+m}$ in B is allowed to be used to construct the precoding matrix W;

the $K_2 \times (2p+1)+m^{th}$ bit of the $T_1$ bits indicates whether the vector $b_{K_2p+m}$ and $b_{K_2(p+1)+m}$ in B is allowed to be used to construct the precoding matrix W;

p is a non-negative integer smaller than $T_1$, m is a non-negative integer smaller than $K_2$.

3. A communication device, wherein the device comprises:

a receiver, configured to receive a first field, wherein the first field comprises $T_1$ bits, the first field indicates one or more vectors that are allowed to be used to construct a precoding matrix W in a vector set, the precoding matrix W comprises N rows and R columns, N is greater than R;

a processor, configured to determine, based on the first field, the one or more vectors are allowed to be used to construct the precoding matrix W in the vector set; wherein R is equal to 3 or 4, an $l^{th}$ column of the precoding matrix W satisfies:

$$W(l) = \begin{bmatrix} b_{k_l} \\ (-1)^l \theta_{p_l} b_{k_l} \\ \varphi_l b_{k_l} \\ (-1)^l \varphi_l \theta_{p_l} b_{k_l} \end{bmatrix},$$

$b_{k_l}$ satisfies $b_{k_l} = v_{l_i} \otimes u_{m_i}$, $v_{l_i}$ satisfies $v_{l_i} = \begin{bmatrix} 1 & e^{j4\pi \frac{l_i}{N_1 O_1}} & \ldots & e^{j4\pi \frac{(N_1/2-1)l_i}{N_1 O_1}} \end{bmatrix}^T$, $u_{m_i}$ satisfies $u_{m_i} = \begin{bmatrix} 1 & e^{j2\pi \frac{m_i}{N_2 O_2}} & \ldots & e^{j2\pi \frac{(N_2-1)m_i}{N_2 O_2}} \end{bmatrix}^T$, and l is a non-negative integer smaller than R−1, i is an integer, $m_i$ is a non-negative integer smaller than $N_2O_2-1$, $l_i$ is a non-negative integer smaller than ½$N_1O_1-1$, $N_1$ and $N_2$ are positive integers and separately represent numbers of antenna port in different dimensions, $O_1$ and $O_2$ are positive integers separately representing Discrete Fourier Transform (DFT) vector oversampling factors in different dimensions, $\theta_{p_l}$ is an element of set $\Phi=\{\theta_0, \theta_1, \ldots, \theta_{S-1}\}$, S is a predefined positive integer, $\varphi_l$ is a complex number of a unit amplitude; $T_1=N_1O_1N_2O_2$, the vector set is vector set B, B=$\{b_0, b_1, \ldots, b_{T_2-1}\}$, $T_2=$½$N_1O_1N_2O_2$, a length of each vector in the vector set B is N/4, bit x of the $T_1$ bits corresponds to a vector of vector set B, bit x indicates used to indicate whether the corresponding vector is allowed to be used to construct the precoding matrix W, bit y of the $T_1$ bits is corresponding to two vectors of vector set B, used to indicate whether the corresponding two vectors can construct the precoding matrix W, x satisfies a condition:

$\lfloor \frac{x}{K_2} \rfloor$ is an even number, y satisfies a condition:

$\lfloor \frac{y}{K_2} \rfloor$ is an odd number, x and y are non-negative integers smaller or equal to $T_1-1$, $K_2=N_2O_2$, $b_{k_1}$ is selected from the one or more vectors that are indicated by the first field.

4. The communication device according to claim 3, wherein the $K_2 \times 2p+m^{th}$ bit of the $T_1$ bits indicates whether the vector $b_{K_2p+m}$ in B is allowed to be used to construct the precoding matrix W;

$K_2 \times (2p+1)+m^{th}$ bit of the $T_1$ bits indicates whether the vector $b_{K_2p+m}$ and $b_{K_2(p+1)+m}$ in B is allowed to be used to construct the precoding matrix W;

p is a non-negative integer smaller than $T_1$, m is a non-negative integer smaller than $K_2$.

5. A non-transitory computer-readable medium, comprising instructions, that when executed by one or more processors, cause the one or more processors to implement the following method:

receiving a first field, wherein the first field comprises $T_1$ bits, the first field indicates one or more vectors that are allowed to be used to construct a precoding matrix W in a vector set, the precoding matrix W comprises N rows and R columns, N is greater than R;

determining and based on the first field, the one or more vectors are allowed to be used to construct the precoding matrix W in the vector set; wherein R is equal to 3 or 4, an $l^{th}$ column of the precoding matrix W satisfies:

$$W(l) = \begin{bmatrix} b_{k_l} \\ (-1)^l \theta_{p_l} b_{k_l} \\ \varphi_l b_{k_l} \\ (-1)^l \varphi_l \theta_{p_l} b_{k_l} \end{bmatrix},$$

$b_{k_l}$ satisfies $b_{k_l} = v_{l_i} \otimes u_{m_i}$, $v_{l_i}$ satisfies $v_{l_i} = \begin{bmatrix} 1 & e^{j4\pi \frac{l_i}{N_1 O_1}} & \ldots & e^{j4\pi \frac{(N_1/2-1)l_i}{N_1 O_1}} \end{bmatrix}^T$, $u_{m_i}$ satisfies $u_{m_i} = \begin{bmatrix} 1 & e^{j2\pi \frac{m_i}{N_2 O_2}} & \ldots & e^{j2\pi \frac{(N_2-1)m_i}{N_2 O_2}} \end{bmatrix}^T$, and l is a non-negative integer smaller than R−1, i is an integer, $m_i$ is a non-negative integer smaller than $N_2O_2-1$, $l_i$ is a non-negative integer smaller than ½$N_1O_1-1$, $N_1$ and $N_2$ are positive integers and separately represent numbers of antenna port in different dimensions, $O_1$ and $O_2$ are positive integers separately representing Discrete Fourier Transform (DFT) vector oversampling factors in different dimensions, $\theta_{p_l}$ is an element of set $\Phi=\{\theta_0, \theta_1, \ldots, \theta_{S-1}\}$, S is a predefined positive integer, $\varphi_l$ is a complex number of a unit amplitude; $T_1=N_1O_1N_2O_2$, the vector set is vector set B, $B=\{b_0, b_1, \ldots, b_{T_2-1}\}$, $T_2=\frac{1}{2}N_1O_1N_2O_2$, a length of each vector in the vector set B is N/4, bit x of the $T_1$ bits corresponds to a vector of vector set B, bit x indicates whether the corresponding vector is allowed to be used to construct the precoding matrix W, bit y of the $T_1$ bits is corresponding to two vectors of vector set B, used to indicate whether the corresponding two vectors can construct the precoding matrix W, x satisfies a condition:

$$\left\lfloor \frac{x}{K_2} \right\rfloor$$

is an even number, y satisfies a condition:

$$\left\lfloor \frac{y}{K_2} \right\rfloor$$

is an odd number, x and y are non-negative integers smaller or equal to $T_1-1$, $K_2=N_2O_2$, $b_{k_l}$ is selected from the one or more vectors that are indicated by the first field.

6. The non-transitory computer-readable medium according to claim 5, wherein the $K_2 \times 2p+m^{th}$ bit of the $T_1$ bits indicates whether the vector $b_{K_2p+m}$ in B is allowed to be used to construct the W;

the $K_2 \times (2p+1)+m^{th}$ bit of the $T_1$ bits indicates whether the vector $b_{K_2p+m}$ and $b_{K_2(p+1)+m}$ in B is allowed to be used to construct the precoding matrix W;

p is a non-negative integer smaller than $T_1$, m is a non-negative integer smaller than $K_2$.

7. A communication device, comprises
a memory, configured to store computer instruction;
a processor, configured to implement the following method:
receiving a first field, wherein the first field comprises $T_1$ bits, the first field indicates one or more vectors that are allowed to be used to construct a precoding matrix W in a vector set, the precoding matrix W comprises N rows and R columns, N is greater than R;
determining and based on the first field, the one or more vectors that are allowed to be used to construct a precoding matrix W in the vector set according to the first field; wherein
R is equal to 3 or 4, an $l^{th}$ column of the precoding matrix W satisfies:

$$W(l) = \begin{bmatrix} b_{k_l} \\ (-1)^l \theta_{p_l} b_{k_l} \\ \varphi_l b_{k_l} \\ (-1)^l \varphi_l \theta_{p_l} b_{k_l} \end{bmatrix},$$

-continued $b_{k_l}$ satisfies $b_{k_l} = v_{l_i} \otimes u_{m_i}$, $v_{l_i}$ satisfies $v_{l_i} = \begin{bmatrix} 1 & e^{j4\pi \frac{l_i}{N_1 O_1}} & \ldots & e^{j4\pi \frac{(N_1/2-1)l_i}{N_1 O_1}} \end{bmatrix}^T$, $u_{m_i}$ satisfies $u_{m_i} = \begin{bmatrix} 1 & e^{j2\pi \frac{m_i}{N_2 O_2}} & \ldots & e^{j2\pi \frac{(N_2-1)m_i}{N_2 O_2}} \end{bmatrix}^T$, and l is a non-negative integer smaller than R-1, i is an integer, $m_i$ is a non-negative integer smaller than $N_2O_2-1$, $l_i$ is a non-negative integer smaller than $\frac{1}{2}N_1O_1-1$, $N_1$ and $N_2$ are positive integers and separately represent numbers of antenna port in different dimensions, $O_1$ and $O_2$ are positive integers separately representing Discrete Fourier Transform (DFT) vector oversampling factors in different dimensions, $\theta_{p_l}$ is an element of set $\Phi=\{\theta_0, \theta_1, \ldots, \theta_{S-1}\}$, S is a predefined positive integer, $\varphi_l$ is a complex number of a unit amplitude; $T_1=N_1O_1N_2O_2$, the vector set is vector set B, $B=\{b_0, b_1, \ldots, b_{T_2-1}\}$, $T_2=\frac{1}{2}N_1O_1N_2O_2$, the length of each vector in the vector set B is N/4, bit x of the $T_1$ bits corresponds to a vector of vector set B, bit x indicates whether the corresponding vector is allowed to be used to construct the precoding matrix W, bit y of the $T_1$ bits is corresponding to two vectors of vector set B, used to indicate whether the corresponding two vectors can construct the precoding matrix W, x satisfies a condition:

$$\left\lfloor \frac{x}{K_2} \right\rfloor$$

is an even number, y satisfies a condition:

$$\left\lfloor \frac{y}{K_2} \right\rfloor$$

is an odd number, x and y are non-negative integers smaller or equal to $T_1-1$, $K_2=N_2O_2$, $b_{k_l}$ is selected from the one or more vectors that are indicated by the first field.

8. The communication device according to claim 7, wherein the $K_2 \times 2p+m^{th}$ bit of the $T_1$ bits indicates whether the vector $b_{K_2p+m}$ in B is allowed to be used to construct the precoding matrix W;

$K_2 \times (2p+1)+m^{th}$ bit of the $T_1$ bits indicates whether the vector $b_{K_2p+m}$ and $b_{K_2(p+1)+m}$ in B is allowed to be used to construct the precoding matrix W; p is a non-negative integer smaller than $T_1$, m is a non-negative integer smaller than $K_2$.

* * * * *

UNITED STATES PATENT AND TRADEMARK OFFICE
CERTIFICATE OF CORRECTION

PATENT NO. : 10,693,537 B2
APPLICATION NO. : 16/560768
DATED : June 23, 2020
INVENTOR(S) : Xueru Li and Ruiqi Zhang It is certified that error appears in the above-identified patent and that said Letters Patent is hereby corrected as shown below:

In the Claims

Column 33, Line 13, in Claim 1, delete "$b_{k1}$" and insert -- $b_{kl}$ --, therefor.

Column 33, Line 35, in Claim 3, delete "$1^{th}$" and insert -- $l^{th}$ --, therefor.

Column 33, Line 67, in Claim 3, after "indicates" delete "used to indicate".

Column 34, Line 19, in Claim 3, delete "$b_{k1}$" and insert -- $b_{kl}$ --, therefor.

Column 34, Line 42, in Claim 5, delete "$1^{th}$" and insert -- $l^{th}$ --, therefor.

Column 35, Line 25, in Claim 5, delete "$b_{k1}$" and insert -- $b_{kl}$ --, therefor.

Column 35, Line 48, in Claim 7, delete "$1^{th}$" and insert -- $l^{th}$ --, therefor.

Column 36, Line 46, in Claim 7, delete "$b_{k1}$" and insert -- $b_{kl}$ --, therefor.

Signed and Sealed this
Twenty-second Day of December, 2020

Andrei Iancu
*Director of the United States Patent and Trademark Office*